(12) United States Patent
Orady et al.

(10) Patent No.: US 8,566,389 B2
(45) Date of Patent: Oct. 22, 2013

(54) THIN NETWORK PROTOCOL

(75) Inventors: Aly E. Orady, Sunnyvale, CA (US); Nils Bunger, Redwood City, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 806 days.

(21) Appl. No.: 11/784,177

(22) Filed: Apr. 4, 2007

(65) Prior Publication Data

US 2008/0010340 A1  Jan. 10, 2008

Related U.S. Application Data

(60) Provisional application No. 60/819,592, filed on Jul. 10, 2006.

(51) Int. Cl.
*G06F 15/16* (2006.01)

(52) U.S. Cl.
USPC .......................................... 709/203

(58) Field of Classification Search
USPC ......... 709/203, 202, 204, 205, 206, 220, 222, 709/223, 227, 228, 249, 250; 719/321, 322, 719/310; 370/395.2; 715/700–866
See application file for complete search history.

(56) References Cited

U.S. PATENT DOCUMENTS

| | | | | |
|---|---|---|---|---|
| 5,748,875 A * | 5/1998 | Tzori | ............................ | 714/29 |
| 6,560,639 B1 * | 5/2003 | Dan et al. | ...................... | 709/218 |
| 6,836,885 B1 * | 12/2004 | Buswell et al. | ............... | 717/172 |
| 7,171,442 B1 * | 1/2007 | Huang | .......................... | 709/203 |
| 7,299,304 B2 * | 11/2007 | Saint-Hilaire et al. | .......... | 710/11 |
| 7,389,516 B2 * | 6/2008 | Rosenbloom et al. | ......... | 719/321 |
| 7,493,373 B2 * | 2/2009 | Takaluoma et al. | ............ | 709/217 |
| 7,519,699 B2 * | 4/2009 | Jain et al. | ...................... | 709/223 |
| 7,523,179 B1 * | 4/2009 | Chu et al. | ....................... | 709/222 |
| 2003/0115298 A1 | 6/2003 | Baker | | |
| 2003/0217166 A1 | 11/2003 | Dal Canto et al. | | |
| 2004/0117438 A1 | 6/2004 | Considine et al. | | |
| 2005/0027870 A1 | 2/2005 | Trebes | | |
| 2005/0160139 A1 | 7/2005 | Boucher et al. | | |

OTHER PUBLICATIONS

Sandhya Senapathi and Rich Hernandez, Introduction to TCP Offload Engines, Mar. 2004, www.dell.com/downloads/global/power/1q04-her.pdf.*

Paul Naish, Peter Bishop, "Designing Asics", 1988, Ellis Horwood Limited, HTML version at web.ukonline.co.uk/paul.naish/DA/contents.htm.*

R.Recio et al., "An RDMA protocol Specification (version 1.0)", Oct. 2002, RDMA Consortium, www.rdmaconsortium.org/home/draft-recio-iwarp-rdmap-v1.0.pdf.*

* cited by examiner

*Primary Examiner* — Ruolei Zong
(74) *Attorney, Agent, or Firm* — Sughrue Mion, PLLC

(57) ABSTRACT

A method for a server to process a transaction on remote client hardware is disclosed. A local request is generated for the transaction. A driver level message to the remote client hardware is generated. The driver level message is sent directly to the remote client hardware to process the transaction.

48 Claims, 17 Drawing Sheets

| 0 | 1 | 2 | 3 | 4 | 5 | 6 | 7 | 8 | 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| Opcode | | | | Length | | | | | | | | Address | | | | | | | | | | | | | | | | | | | |
| Transaction ID | | | | | | | | | | | | | | | | Data | | | | | | | | | | | | | | | |
| Data | | | | | | | | | | | | | | | | | | | | | | | | | | | | | | | |

| Field | Description |
|---|---|
| OpCode | 4-bit code indicating the type of transaction to be performed. |

| OpCode | Description |
|---|---|
| 0x0 | Configuration Read Request |
| 0x1 | Configuration Write Request |
| 0x2 | Configuration Read Return |
| 0x3 | CSR Read Request |
| 0x4 | CSR Write Request |
| 0x5 | CSR Read Return |
| 0x6 | Interrupt |
| 0x7 | Error |
| 0x8 | Announce |

| Field | Description |
|---|---|
| Length | Length of the transaction in 32-bit words. |
| Address | The word address of the transaction. (Words are 32-bits) |
| Transaction ID | Transaction identifier selected by the host and used to associate responses from the client with the requests initiated by the host. |
| Data | Data associated with the transaction for operations that have data. |

FIG. 3B

| Address (Hex) | Description |
|---|---|
| 0x0000 | Device Class: 32-bit value indicating the class of device. Example of classes include: Video Input, Video Output, Audio Input, Audio Output, USB, Mass Storage, Human Interface, and Composite Device. |
| 0x0001 | Vendor ID: 32-bit value unique to each hardware vendor. |
| 0x0002 | Device ID: Unique 32-bit value assigned by each vendor to each device. (All instances of the same device have the same Device ID) |
| 0x0003 | Device Revision: 32-bit revision code used to identify the device revision. |
| 0x0004 | Capability Structure Pointer: The bottom 24-bits of this 32-bit field indicate the starting address of a capability structure. The upper 8-bits of this 32-bit field indicate the total length in words of the entire capability structure. If this field has a value of 0x0, then there are no capability structures. |

FIG. 3C

| Offset (Hex) | Description |
|---|---|
| 0x0000 | Type: 32-bit value unique to each type of capability structure. |
| 0x0001 | Next Capability Structure Pointer: The bottom 24-bits of this 32-bit field indicate the starting address of a capability structure. The upper 8-bits of this 32-bit field indicate the total length in words of the entire capability structure being pointed to. If this field has a value of 0x0, then there are no more capability structures in the chain. |
| 0x0002 – end | The remaining addresses may be used as desired by the capability structure. |

FIG. 3D

| Offset (Hex) | Description |
| --- | --- |
| 0x0000 | Capability Structure ID (0x002) |
| 0x0001 | Next Capability Structure Pointer |
| 0x0002 | Peer Connected: Indicates if a peer is connected. Read-Only. |
| 0x0003 | Peer Ethernet Address (High): Upper 16-bits of the Ethernet address of the peer a connection is currently established to. Read-Only. |
| 0x0004 | Peer Ethernet Address (Low): Lower 32-bits of the Ethernet address of the peer a connection is currently established to. Read-Only. |
| 0x0005 | Peer IP Address: IP Address of the peer a connection is currently established to. (Read Only) |
| 0x0006 | Peer UDP Port: UDP Port of the peer a connection is currently established to. (Read Only) |
| 0x0007 | PACKET_TIMEOUT: The amount of time to wait before retransmitting a TNP datagram sent to this peer. This value supersedes the value in the TNP Capability Structure. Read-Write. |
| 0x0008 | Maximum Transmit Rate: The maximum rate at which data may be transmitted onto the network. This value supersedes the value in the TNP Capability Structure. Read-Write. |
| 0x0009 | Maximum Transmit Unit: The maximum size of a datagram that may be transmitted onto the network. This value supersedes the value in the TNP Capability Structure. Read-Write. |

FIG. 3E

THIN NETWORK PROTOCOL

CROSS REFERENCE TO OTHER APPLICATIONS

This application claims priority to U.S. Provisional Patent Application No. 60/819,592 entitled METHOD AND APPARATUS FOR THIN NETWORK DEVICES filed Jul. 10, 2006 which is incorporated herein by reference for all purposes.

BACKGROUND OF THE INVENTION

Digital networks allow interoperability between devices such as printers network attached storage, home media systems, client and server machines, and telephones. Unfortunately, the cost of configuring and maintaining digital networks and devices is expensive.

The cost of manufacturing digital network devices may be high because of overhead stemming from computer hardware within the device that is required to adhere to network protocols. Furthermore, the complexity of the computer hardware may require computer software to be installed. Maintaining, upgrading and securing the computer software adds further costs to the system. Complex computer software can also be infected by computer viruses, which cause costs for prevention and treatment. Finally, complex computer hardware and software may require expensive specialized technicians to manage the network devices.

Therefore, there exists a need for improved techniques for designing and attaching devices to a digital network.

BRIEF DESCRIPTION OF THE DRAWINGS

Various embodiments of the invention are disclosed in the following detailed description and the accompanying drawings.

FIG. 3B is a diagram illustrating an example End Point Zero message.

FIG. 3C is a table illustrating an example configuration address space and its resources.

FIG. 3D is a table illustrating an example capability structure format.

FIG. 3E is a table illustrating an example TNP Peer Capability Structure.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
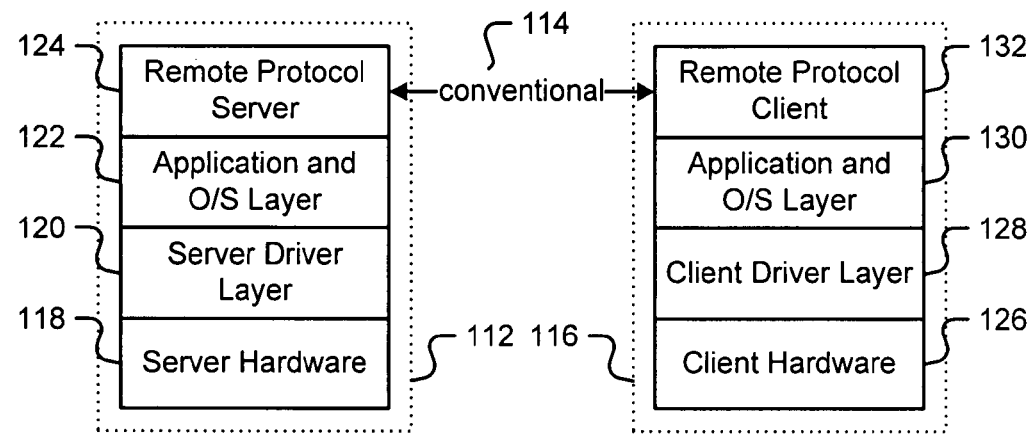
FIG. 1A is a block diagram illustrating an embodiment of a typical server and client system using a conventional network protocol.

FIG. 1A is a block diagram illustrating an embodiment of a typical server and client system using a conventional network protocol. Server 112 is connected using a conventional protocol 114 to client 116 through a network. Throughout this specification, "network" refers to any public or private network and/or combination thereof. A network may include the Internet, an Ethernet, a serial/parallel bus, intranet, NAS, SAN, LAN, WAN, or any form of connecting multiple systems and/or groups of systems together.

Server 112 includes server hardware 118, server driver layer 120, server application and operating system layer 122, and remote protocol server 124. Server hardware 118 includes the server central processing unit ("CPU"), server motherboard and server peripherals. Server driver layer 120 includes the drivers for the server's internal and external peripherals. Server application and operating system 122 include the server operating system and applications to be executed by clients 116. The remote protocol server 124 uses a remote protocol to communicate with client 116. In many embodiments the remote protocol is Remote Desktop Protocol ("RDP") or Independent Computing Architecture ("ICA") on top of the Transmission Control Protocol over the Internet Protocol ("TCP/IP.")

Client 116 includes client hardware 126, client driver layer 128, client application and operating system layer 130, and remote protocol client 132. Client hardware 116 includes the client CPU, client motherboard and client peripherals. Client driver layer 128 includes the drivers for the client's internal and external peripherals, and typically includes a TCP/IP stack to run on the client CPU. Client application and operating system layer 130 include the client operating system and applications to be executed by client 116. In some embodiments, the client applications are a web browser or terminal services. The remote protocol client 132 uses a remote protocol to communicate with server 112. The remote protocol server 124 and remote protocol client 132 are the point of connectivity in server 112 and client 116 through conventional protocol 114.

Figure 1B:
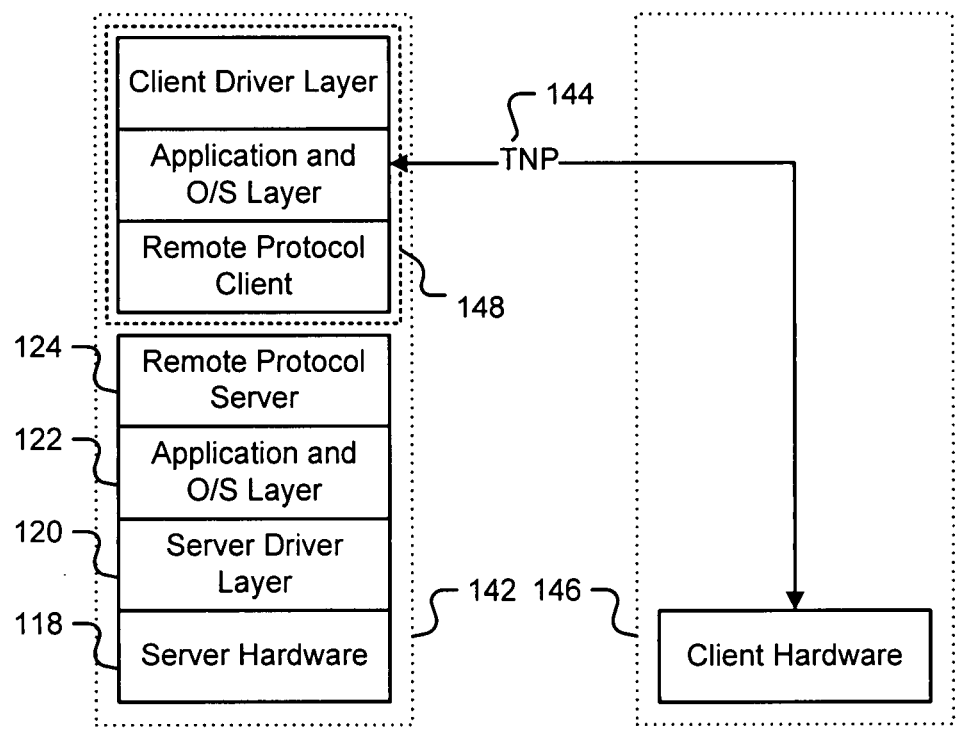
FIG. 1B is a block diagram illustrating an embodiment of a system that takes advantage of a thin network protocol ("TNP") while emulating a remote protocol.

FIG. 1B is a block diagram illustrating an embodiment of a system that takes advantage of a thin network protocol ("TNP") while emulating a remote protocol. Server 142 is connected using TNP 144 to thin client 146 through a network. In some embodiments, TNP 144 is called a Thinium Network Protocol. In some embodiments, TNP 144 is structured on top of the unreliable but simple User Datagram Protocol ("UDP") over the Internet Protocol ("UDP/IP.")

By emulating a remote protocol, server 142 can interoperate with other clients. In some embodiments, server 142 interoperates with RDP or ICA clients. Compared to server 112, server 142 has the identical components 118, 120, 122 and 124 but adds a remote protocol loopback interface 148 to emulate the remote protocol internally to server 142. In some embodiments remote protocol loopback interface 148 is a separate machine external to server 142 that uses remote protocol to communicate between remote protocol server 124 and remote protocol client 150. In some embodiments remote protocol loopback interface 148 is a software module in server 142 that internally communicates between remote protocol server 124 and remote protocol client 150.

The remote protocol loopback interface 148 includes the functionality of the client driver layer 128, client application and operating system layer 130 and remote protocol client 132. Thin client 146 is thus reduced in complexity to the functionality of client hardware 126. As a result, all client driver level messages are directly sent over TNP 144 from thin client 146 to server 142, rather than processed by the client internally as is the case with client 116. Conversely, the server 142 sends driver level messages directly to thin client 146. Throughout this specification, "to send the driver level message directly" or "sending the driver level message directly" refers to any sending of a driver level message that does not require an instruction based processing element, such as a CPU, microcontroller unit ("MCU"), or digital signal processor ("DSP"), to receive or interpret the driver level message.

By providing a remote protocol loopback interface 148, the server 142 can interface successfully with multiple different clients, including a client 116 and a thin client 146. Because the thin client 146 does not require a client driver layer 128, a client application and operating system layer 130, or remote protocol client 132, thin client 146 can be comprised of only hardware.

Throughout this specification, "hardware" refers to any physical configuration of digital circuits to perform a task, including custom silicon integrated circuits, application specific integrated circuits ("ASICs"), field programmable gate arrays ("FPGAs") or programmable logic devices ("PLDs.") Throughout this specification, "practically implementable by hardware" refers to any algorithm that is directly, natively or practically realizable by hardware, such that the algorithm would completely fit on a single commercially available FPGA or PLD. Thin client 146 is practically implementable by hardware.

In some embodiments, thin client 146 is a thin client, network printer, VoIP phone. In some embodiments, thin client 146 has a computer peripheral, either a serial device, parallel device, universal serial bus ("USB") device, Firewire device, keyboard device, mouse device, human input device, video device, audio device, printer, scanner, or network adapter.

Figure 1C:
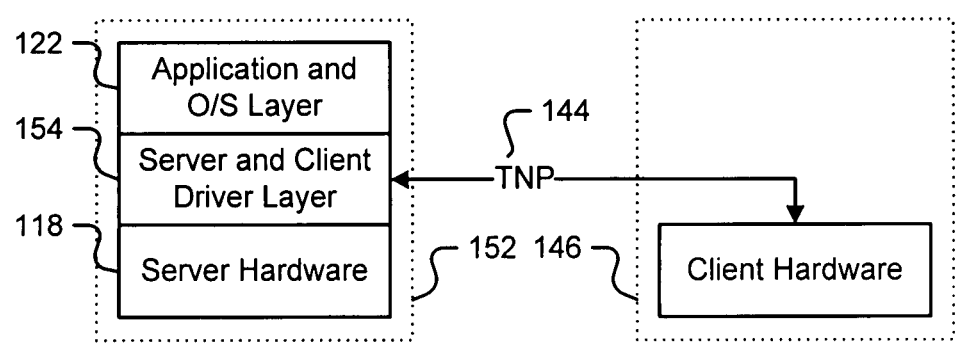
FIG. 1C is a block diagram illustrating an embodiment of a system that takes advantage of a TNP without emulating a remote protocol.

FIG. 1C is a block diagram illustrating an embodiment of a system that takes advantage of a TNP without emulating a remote protocol. Server 152 is connected using TNP 144 to thin client 146 through a network. Compared to server 142, server 152 removes the remote protocol loopback interface 148. Server 152 is reduced in complexity compared to server 142, but can no longer interface successfully with client 116, and can only interface successfully with thin client 146. The server 152 contains a server and client driver layer 154 that contains drivers for both server and clients. Again, all thin client 146 driver level messages are communicated over TNP 144 from thin client 146 to server 152, rather than processed by the client internally as is the case with client 116.

Figure 1D:
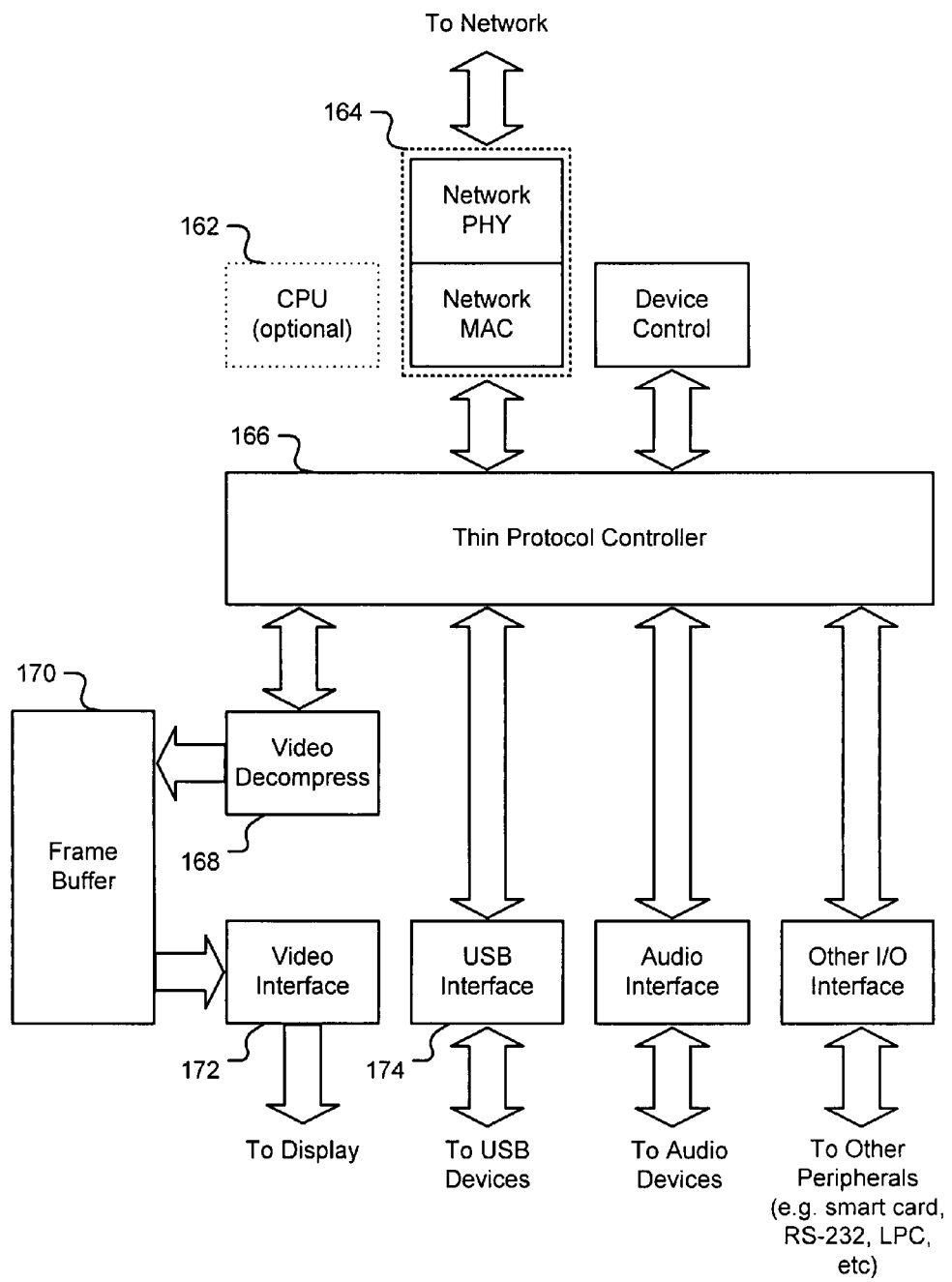
FIG. 1D is a block diagram illustrating an embodiment of a thin client architecture.

FIG. 1D is a block diagram illustrating an embodiment of a thin client architecture. In some embodiments, the client architecture in FIG. 1D is the architecture for thin client 146. The client architecture is designed to enable a very lightweight client implementation while at the same time eliminating client management and providing a secure computing platform.

The distinguishing feature of the client architecture is that all client and host communications are performed without an actual CPU included on the client. TNP 144 provides all the network data delivery services required for a thin client, including reliable and unreliable data delivery, flow control, congestion control, and flow segmentation. A distinguishing feature of TNP 144 is that it is optimized to enable a very lightweight, hardware-only client implementation.

TNP also provides a mechanism for a server to remotely discover, authenticate, provision, and configure the client. After the discovery and authentication, the server has complete control over the register space of the thin client, eliminating the need for a CPU for these steps as well. This makes a CPU 162 optional in the client design.

In some embodiments, the network interface 164 is a 10/100 Ethernet port, a WiFi connection, a gigabit Ethernet port, a USB interface, or a ultra-wideband ("UWB") interface. The client architecture contains a standard physical ("PHY") layer and medium access control ("MAC") layer for the network interface 164. In some embodiments, the network interface 164 contains an Ethernet MAC. The network interface 164 provides L1-L3 Open Systems Interconnection ("OSI") model services: unreliable delivery of datagrams over a switched or unswitched network.

The thin protocol controller ("TPC") 166 is responsible for L4 OSI transport layer service. The TPC 166 implements TNP 144. On one side, the block interfaces to the network interface 164 MAC layer, and on the other side, it exposes one or more 'endpoint' interfaces. The endpoint interfaces provide separate data flows for each type of data that is transported over TNP 144.

TPC 166 implements preferably at least the following endpoints:
1) Endpoint 0: configuration register space in all devices;
2) Screen data endpoint: unreliable data delivery, unidirectional, high bandwidth;

3) Audio data endpoint: unreliable data delivery, bidirectional, low bandwidth; and 4) USB mini-hub endpoint: reliable data delivery, bidirectional, high bandwidth.

Additional peripherals, such as an integrated RS-232 serial port, can be added with additional endpoints. The number of endpoints is determined based on feature set during the product's design.

The video decompression block 168 accepts data from TPC 166, decompresses it, and writes it to the frame buffer 170. In some embodiments the decompression is RLE based.

The frame buffer 170 is the client's local copy of the screen. The frame buffer 170 is updated by being written from the network interface 164 through the screen endpoint. The frame buffer 170 is being read all the time to drive the video display with data at the screen's update rate. The frame buffer 170 preferably holds at least a full screen's worth of data. For example, a 1280×1024 display with 24 bits of color depth corresponds to 30 Mbits of data. In some embodiments the client architecture supports up to 1600×1200 with full color depth, therefore 64 Mbits is required. In some embodiments, page flipping support doubles the memory required again to 128 Mbits.

The frame buffer 170 has high read bandwidth requirements because it is the source for screen data every refresh cycle. For example, a 1600×1200×24 display being refreshed at 60 Hz requires raw dynamic random access memory ("DRAM") read bandwidth of 1600×1200×24×60=2.76 Gbits/sec. The frame buffer 170 also has high write bandwidth requirements due to the decompressed video coming from the network interface 164 to be written to the frame buffer 170. The bandwidth is very bursty and depends on the compression standard in use. For example, when the Ethernet port is fully utilized for a burst video update at 100 Mbit/sec, and there is compression of 20:1, then a burst of 2 Gbit/sec is easily realizable; in fact, the instantaneous compression ratio can be even higher, so there are 'worst-case' patterns that could exceed this bandwidth.

Due to the size of frame buffer 170 it is typically an external component. The external component will be accessed efficiently due to the high bandwidth requirements for reading and writing. In some embodiments, dual data rate DRAM ("DDR-DRAM") is used for frame buffer 170 due to its low cost and high bandwidth capability. The raw bandwidth of a 32-bit DDR-DRAM chip operating at 100 MHz is 6.4 Gbit/sec. About 5-10% of the bandwidth is lost to required refresh cycles and required empty cycles for read/write turnarounds, so about 5.8-6.0 Gbit/sec is available for reads and writes. An efficient data layout is required to be able to use all or most of this available bandwidth.

To obtain the high bandwidth of DDR-DRAM, consideration goes into the layout of data in DRAM to allow efficient read and write access. The client architecture can store a group of pixels, for example a horizontally adjacent group of pixels, together in a burst in such a way as to provide periodic alignment between DRAM addresses and physical pixel locations. Additional padding, including bits which are not actually part of video data, may also be required as part of the group to provide alignment. The exact alignment depends on the number of bits stored per pixel and the number of data wires connected to the DDR-DRAM. Depending on the alignment of the memory and pixel boundaries, DDR-DRAM's truncated burst capability may be used so that video data which isn't used does not need to be fetched.

In some embodiments, pixels are stored in 24 bits per pixel format, with a 32-bit data bus to one or more DDR-DRAM chips. With a 32-bit data bus, the DDR-DRAM will receive or transmit 64 bits of data every burst cycle. Pixel data boundaries occur every 24 data bits, and cycle boundaries for DDR-DRAM occur every 64 bits.

With these parameters, a common boundary for both pixel and DDR-DRAM occurs every 192 bits of data, which provide 8 video pixels, and is also exactly 3 DDR burst cycles. To provide memory alignment to 256-bit boundaries, which is necessary for efficient DDR reads and writes, 64 bits of memory padding is added, to create a group of pixels plus memory padding that is exactly 256 bits, or 4 DDR burst cycles, long.

Continuing the example, it would be ideal to perform DDR reads and writes in 3 cycle bursts, so as not to use memory bandwidth reading and writing the 64 padding bits. However, a DDR burst of 3 cycles in length is not actually directly realizable, as DDR bursts are either 2, 4, or 8 cycles, based on the DDR standard. It is, however, possible to implement this using "truncated" access supported by the DDR-DRAM standard. A DDR read or write can be truncated before completion by issuing another DDR read or write in the correct cycle to preempt the previous DDR read or write.

In the example, all reads and writes would be issued as DDR burst of 4 (or 8) commands. A second read or write command is issued exactly 3 cycles after the previous read or write command, causing the DDR-DRAM chip to begin a read or write after completing 3 cycles of the previous DDR burst. This effectively truncates the previous read or write after 3 cycles.

A similar implementation can be realized with other types of burst-capable external memories (DDR-II, DDR-III, etc) depending on cost and bandwidth considerations.

The thin client device operates by storing an image of the screen in a frame buffer 170 and constantly outputting the image onto a video interface 172 at a regular interval governed by the refresh rate of the monitor. At times, it is beneficial to give the screen the appearance of being updated instantaneously. This gives the user the impression of higher performance and eliminates flicker during video playback. The illusion of an instantaneous update can be created by the use of page flipping, or "double buffering" of the frame buffer. In such a case, the thin client will maintain two copies of the frame buffer. The first copy, known as the active frame buffer, is used to drive an image onto the monitor. The second frame buffer, known as the shadow frame buffer, receives a series of updates. Once all updates are ready to be displayed, the active and shadow frame buffers are instantaneously swapped between refresh cycles. After the swap, the copy of the frame buffer previously used as the shadow buffer becomes used as the active buffer, and the previously active buffer is used as the shadow buffer.

The use of page flipping does not prevent the active frame buffer from being updated. Heuristics can be used to determine when the user experience will be improved by page flipping, and when page flipping should not be used. Panning allows a user to experience a session with a higher resolution than that of his monitor. In such a case, the frame buffer 170 is larger than the resolution of the monitor. A sub-section of the frame buffer 170, known as the view-port, with a size matching the resolution of the monitor is outputted on the video interface 172 to the monitor. As the user moves the cursor or carat, the position of the view-port into the frame buffer 170 is changed. This gives the user the illusion of panning.

The video interface 172 is a standard interface to a computer monitor. In some embodiments, video interface 172 is a video graphics array ("VGA") or digital visual interface ("DVI") interface. In some embodiments, video interface 172 can drive up to 1600×1200 resolution at 24 bits. The video interface 172 may implement a hardware cursor which is directly connected to a USB mouse, allowing local cursor feedback without a round-trip latency to server 142 or server 152. The hardware cursor consists of a small buffer (which can be part of the frame buffer or stored on-chip), which contains a cursor bitmap including alpha channel for blending.

The hardware cursor's alpha channel consists of a novel implementation which minimizes the required gatecount. In its most general form, an alpha value alpha provides a way to mix a background color value C_B with a cursor color value C_C to produce the output color value C_O as follows:

$$C\_O = C\_C \times \backslash alpha + C\_B \times (1 - \backslash alpha).$$

An inexpensive approximation to this can be reached with shift and add operations:

$$C\_O = (C\_C << n + C\_B << m) >> p,$$

where p is a constant value, n and m are a function of \alpha and are chosen to provide a close approximation of the correct blending for a given \alpha. This approximation only provides a limited number of alpha values. For example, in an 8-bit-per-color system, there are 16 alpha values. Since the eye is not very sensitive to alpha variations, this is considered sufficient for cursor alpha implementation.

The client architecture provides nearly full USB support by tunneling USB requests between clients and servers. The USB interface block 174 implements the client side of this capability, and provides one or more ports for USB devices. In some embodiments, USB 1.1 or USB 2.0 support can be provided. This tunneled USB support is called "Remote USB" in this specification.

Figure 1E:
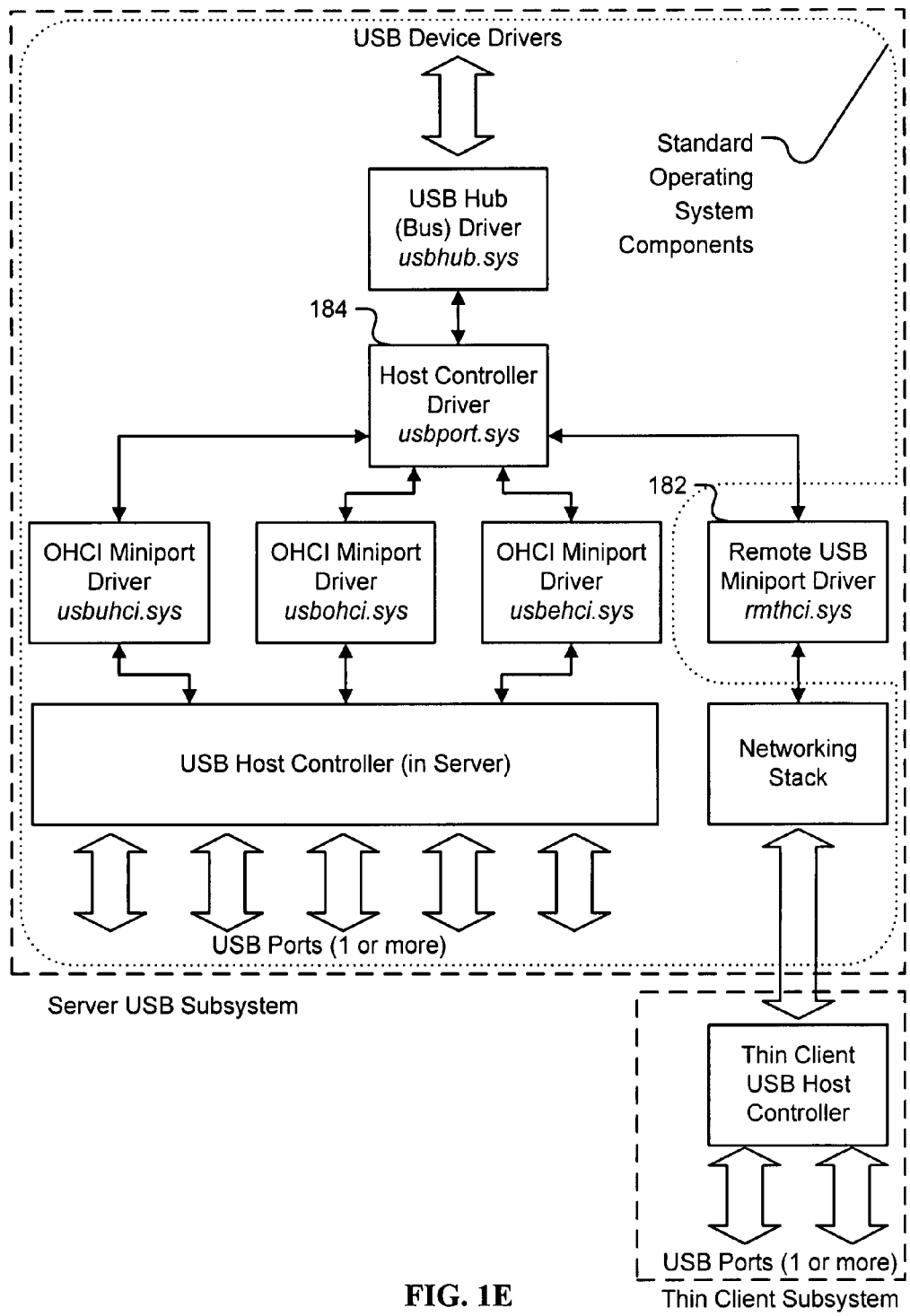
FIG. 1E is a block diagram illustrating an embodiment of Remote Universal Serial Bus ("USB.")

FIG. 1E is a block diagram illustrating an embodiment of Remote USB. The shaded boxes indicate components that are not part of standard operating system components. FIG. 1E shows the specifics of the USB subsystem on the server for a Microsoft Windows Server for illustrative purposes; a similar driver stack exists in Linux and other operating systems. This architecture applies whether the server running its operating system in a virtual machine, for example a VMWare or Xen session, or directly on the hardware.

The Remote USB Miniport Driver 182 ("Rmthci") is a driver layer on the server which implements generic USB capability remotely. Rmthci 182 appears to the rest of the server operating system as another USB miniport driver with a set of attached USB ports. The interface from Host Controller Driver 184 to Rmthci 182 consists of data transfer requests, completions, and configuration and error messages.

Rmthci 182 exposes the same API to the layer above it as any other USB miniport driver. Once a request to transfer data has been received, Rmthci 182 breaks the request into network packets which are sent over TNP 144 to the client network interface 164. When the server receives a response indicating that the transfer is acknowledged, Rmthci 182 receives that response and indicates completion to the upper layers of the USB stack.

Figure 2A:
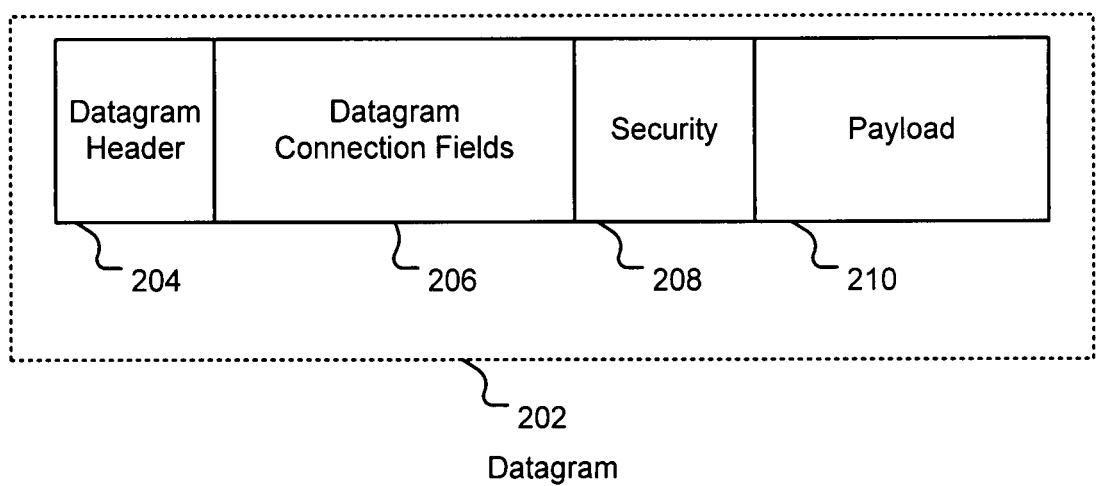
FIG. 2A is a diagram illustrating a general packet format for a TNP.

FIG. 2A is a diagram illustrating a general packet format for a TNP. These packets are units of data also referred to as TNP datagrams 202. The TNP datagram 202 includes a datagram header 204, datagram connection fields 206, security field 208, and payload 210. Datagram header 204 includes version and identification information. Datagram connection fields 206 allow for host to client connections. Security field 210 is reserved for authentication and encryption of the TNP datagram 202. The payload 210 is the data carried by TNP datagram 202.

TNP 144 allows two or more devices to communicate with one another over a network while minimizing the size and complexity of the required implementation. In some embodiments, TNP 144 is implemented in hardware using digital logic. In some embodiments, TNP 144 is implemented in software. Any communication between devices can be considered to be the combination of a plurality of host to client interactions. In a given interaction, the host is the initiator of the communication, and the client is the target. On a network, each device may simultaneously assume of the role of host and client, and multiple hosts and clients may coexist on the network. Furthermore, each device may simultaneously assume the role of multiple hosts and/or multiple clients.

TNP 144 allows for communication across any computer or telecommunications network. TNP 144 transfers datagrams across the underlying network. In some embodiments, TNP datagrams 202 are transferred over UDP/IP, making it possible to use TNP 144 over any IP capable network such as Ethernet, wireless Ethernet, or general packet radio service ("GPRS.")

TNP 144 allows for two forms of host to client interactions. The first form is referred to as connection-less transport, and the second is referred to as connection oriented transport.

All interactions serve to transfer units of data referred to as messages between the host and client, or the client and host. These messages are carried over the network using TNP datagrams 202. A message may be as short as 1 byte, or as long as is supported by the particular embodiment. In some embodiments, the size of the message is limited based on various factors including the amount of available buffering and the maximum transmit unit ("MTU") on the underlying network. A message fits within a single TNP datagram 202 to be transferred on the underlying network. A message may be considered a small portion of a larger data transfer. Messages may be used to transfer commands in addition to data. Commands are specially encoded data bytes requesting the host or client to perform a certain action.

Figure 2B:
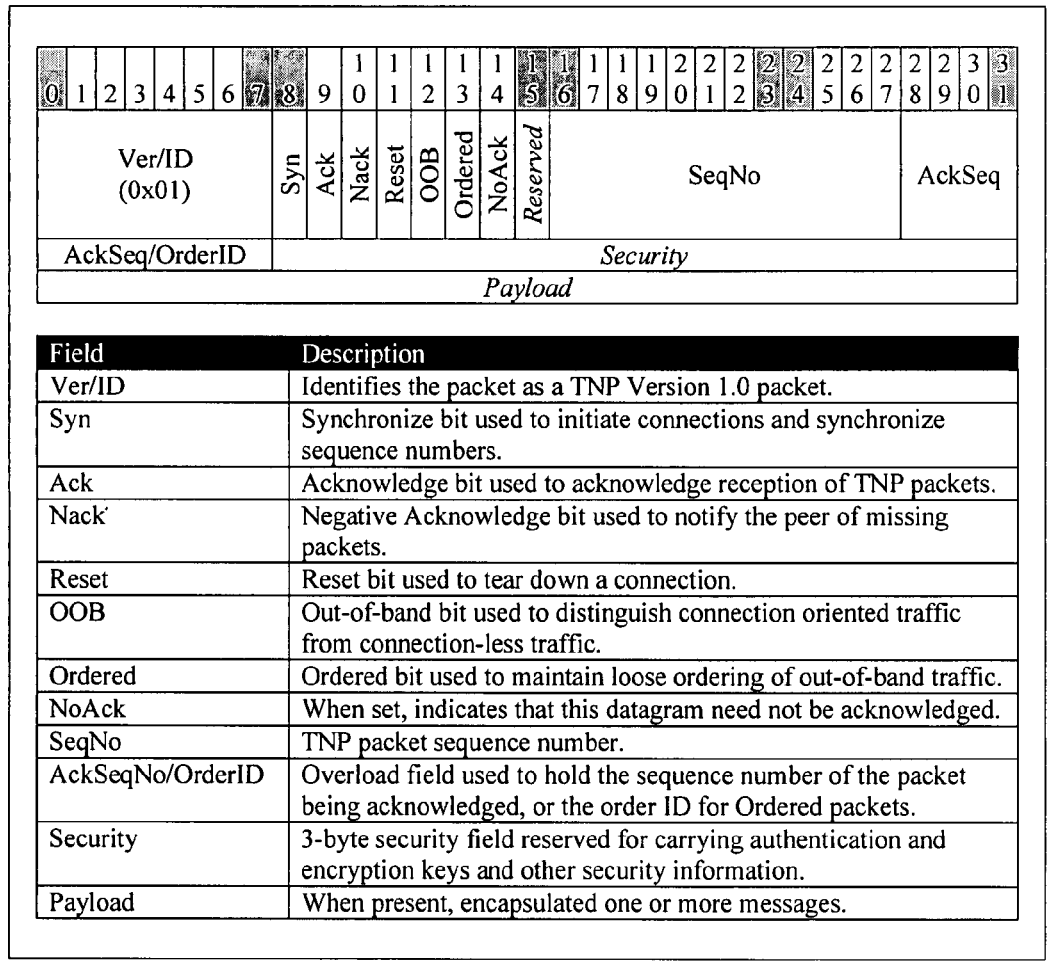
FIG. 2B is a diagram illustrating an example TNP datagram.
Figure 2C:
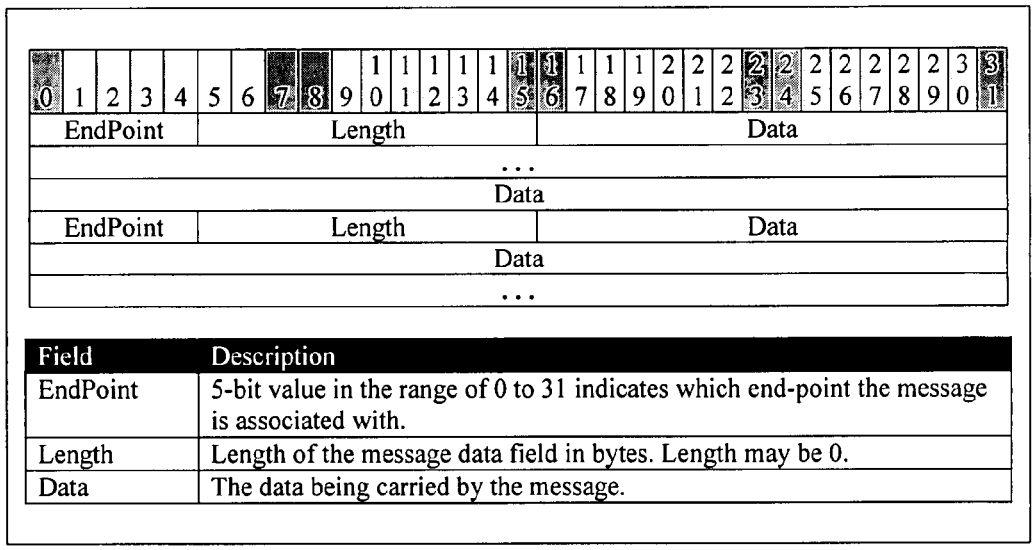
FIG. 2C is a diagram illustrating an example payload for a TNP datagram.

FIG. 2B is a diagram illustrating an example TNP datagram. In some embodiments, TNP datagram 202 contains the following fields:

Oob: 1-bit Boolean to indicate if the TNP datagram 202 is part of connection-less transport or connection-oriented transport. If the Oob bit is set, the TNP datagram 202 should be processed under the rules set forth for connection-less transport. If the Oob bit is cleared, the TNP datagram 202 should be processed under the rules set forth for connection-oriented transport;

Syn: 1-bit Boolean to indicate when sequence numbers need to be synchronized as part of a connection-oriented transport's connection setup sequence, or when order ID need to be synchronized as part of a connection-less transport interaction;

Ack: 1-bit Boolean indicating if the TNP datagram 202 is acknowledging a TNP datagram 202 received;

Nack: 1-bit Boolean indicating if the TNP datagram 202 is indicating that a lost TNP datagram 202 was detected;

Rst: 1-bit Boolean used for connection-oriented transport indicating when a connection is being torn down;

Ordered: 1-bit Boolean used to indicate when the OrderId field is valid;

SeqNo: Sequence number of TNP datagram 202;

AckSeqNo: Sequence number of TNP datagram 202 being acknowledged when the Ack bit is set, or the sequence number of the next expected datagram when the Nack bit is set;

OrderId: OrderId used to determine the order of TNP datagrams 202 for connection-less transport. Sequence numbers, such as SeqNo, and OrderId are compared using a circular comparison function;

Messages: A TNP datagram 202 with a payload may contain one or more messages. Each message may be 1 or more bytes in length. The special case of zero-byte messages may also be optionally supported; and Payload: A TNP datagram 202 may contain a payload 210. FIG. 2C is a diagram illustrating an example payload for a TNP datagram. A payload 210 is 1 or more bytes comprising data, commands, or messages. In some embodiments, a payload 210 is used to carry one or more messages.

Connection oriented transport allows a series of messages to be reliably transferred in order between a host and a client. Before messages may be transferred, the host initiates a connection setup sequence in order to establish a connection. Once the connection has been established, messages may flow in either direction until either the host or client tears down the connection.

A host or client may have several established connections simultaneously. In some embodiments, to reduce complexity a client may be restricted to a small number of connections, or one connection. When a TNP datagram 202 is received by a host or client, it determines if the TNP datagram 202 is associated with connection oriented or connection-less transport. Further, it determines if the TNP datagram 202 is associated with a currently established connection. The former is determine by examining the Oob bit in the TNP datagram 202, and the latter is determine by examining various fields in the packet containing the TNP datagram 202 and comparing those fields against a table of peers to which a connection is currently established in order to identify the peer and its associated connection.

The exact structure of the peers table is dependent on the type of network carrying the TNP datagrams 202. In some embodiments, TNP datagrams 202 are transported using UDP/IP. In such an embodiment, the peer would be identified by its IP address and UDP port number.

For each established connection, the host and client maintains a set of resources such as a state variable associated with a state machine, various sequence numbers, and various timers. The description below of connection oriented transport makes references to these resources under the assumption that a unique resource is allocated for each connection.

A host may initiate a connection setup sequence to a client by sending a TNP datagram 202 containing a connection request to the client. The client may either accept or refuse the connection by responding with a TNP datagram 202 containing either a positive or negative acknowledgement. The connection is completed by the host sending the client a TNP datagram 202 acknowledging that the connection setup is complete. This process is described in more detail below.

The host and client each maintain a state machine to assist with the process. The host state machine has the following states: IDLE, SYN, ACK, and CONNECTED. The client state machine has the following states: IDLE, SYN-ACK, and CONNECTED. Initially, both the host and client are in the IDLE state. The following procedure is used:

Step 1. SYN: First, the host creates an entry in the peer table to help identify future TNP datagrams 202 received as part of this connection. The host sends the client a TNP datagram 202 with the Syn bit set, and the SeqNo field set to the sequence number of the first TNP datagram 202 of the connection for TNP datagrams 202 traveling from the host to the client. This sequence number may be selected arbitrarily by the host. Once the TNP datagram 202 is sent, the host enters the SYN state;

Step 2. SYN-ACK: Once the client receives TNP datagram 202 sent in step 1, adds an entry to its peer table, enters the SYN-ACK state, and responds to the host with a TNP datagram 202 with both the Syn and Ack bits set, the SeqNo field indicating the sequence number of the first TNP datagram 202 of the connection for TNP datagrams 202 traveling from the client to the host, and the AckSeqNo field set to the sequence number of the TNP datagram 202 received in Step 1The SeqNo selected by the client is also arbitrary; and Step 3. ACK: Once the host receives the TNP datagram 202 sent in step 2, it enters the ACK state and responds to the client with a TNP datagram 202 with the Ack bit set, the SeqNo field having been incremented, and the AckSeqNo indicating the sequence number of the TNP datagram 202 received in Step 2. Upon reception of this TNP datagram 202, the client enters the CONNECTED state. After transmitting this ACK TNP datagram 202, the host may begin transmitting TNP datagrams 202 containing messages. Optionally, the host may include a message in the TNP datagram 202 sent in this step.

The TNP protocol is designed to be carried over unreliable networks. Hence, datagrams may have been lost during any of these steps. The following rules are followed to ensure successful connection setup:

Rule 1: If the host transmits a SYN TNP datagram 202 and does not receive a response within a reasonable amount of time (SYN_TIMEOUT), it may re-transmit the SYN request with the same sequence number. This may be repeated a reasonable number of times (SYN_MAX_RETRY) at which point the host should give up and enter the IDLE state;

Rule 2: If the client receives a SYN request from the same peer while in the SYN-ACK state, it re-transmits the SYN-ACK TNP datagram 202 previously transmitted with the same sequence numbers previously used;

Rule 3: If after transmitting a SYN-ACK, the client does not receive an ACK within a reasonable amount of time (SYNACK_TIMEOUT), it re-transmits the SYN-ACK TNP datagram 202 previously transmitted with the same sequence numbers previously used. This may be repeated a reasonable number of times (SYNACK_MAX_RETRY) at which point the client should give up and enter the IDLE state;

Rule 4: If the host receives a SYN-ACK TNP datagram 202 while in the ACK state, it re-transmits the ACK TNP datagram 202 previously sent with the same sequence numbers. Any packets sent after the ACK packet is also be re-transmitted;

Rule 5: If the host is in the ACK state and receives a TNP datagram 202 acknowledging a TNP datagram 202 with a payload sent after the ACK packet in Step 3, then the host will enter the CONNECTED state;

Rule 6: If the client receives a SYN from its peer while in the CONNECT state, it responds with a TNP datagram 202 with the Ack bit set and AckSeqNo set to the sequence number of the most recently received valid TNP datagram 202; and Rule 7: If while in the SYN state the host receives a packet with the Ack bit set and the Syn bit is not set, it responds with a packet with only the Rst bit set.

If the client receives a connection request but does not have the resources to accept the connection or does not wish to accept the connection for any other reason, it refuses the connection by responding with a packet with both the Syn and Nack bits set, and the AckSeqNo field set to the sequence number of the SYN packet requesting the connection.

Optionally, the client need not implement the SYNACK_TIMEOUT and SYNACK_MAX_RETRY mechanisms.

Instead, the burden of detecting a lost Step-3 ACK may be placed on the host. This is accomplished by always including a message in the ACK TNP datagram 202 sent in Step-3. When the client receives the TNP datagram 202 containing the ACK and message, it will respond with an acknowledgement. The host may use the acknowledgement to determine when the Step-3 ACK has been received by the client and the connection setup sequence is complete. If after sending the Step-3 ACK to the client, the host does not receive an acknowledgement within a reasonable amount of time, it should retransmit the Step-3 ACK. This may be repeated a reasonable number of times if necessary, at which point the host may give up and return to the IDLE state.

Once the connection between the host and client has been setup, TNP datagrams 202 continue to flow between the host and client to maintain connection state, transfer messages, and ensure reliable reception of messages. Once connected, a TNP datagram 202 may contain an acknowledgement, or payload, or both. The SeqNo field contains a valid sequence number. The SeqNo field of TNP datagrams 202 without a payload contains the sequence number of the next TNP datagram 202 with a payload that will be transmitted. For TNP datagrams 202 with the Ack bit set, the AckSeqNo field contains the sequence number of the last TNP datagram 202 with a payload received For TNP datagrams 202 with the Nack bit set, the AckSeqNo field contains the next expected sequence number of a TNP datagram 202 with a payload.

Once in the ACK or CONNECTED state, the host abides by the following rules:

Rule 1: The host maintains a TXSEQNO sequence number to keep track the sequence number of transmitted TNP datagrams 202;

Rule 2: The TXSEQNO may be initialized to any value. The initial value is transmitted in the SYN packet initiating the connection. The TXSEQNO is incremented when the host receives the SYN-ACK TNP datagram 202 that pushes it into the ACK state;

Rule 3: Each TNP datagram 202 transmitted by the host contains the value of TXSEQNO in the SeqNo field;

Rule 4: If a TNP datagram 202 is transmitted with a payload, then TXSEQNO is incremented after the packet is transmitted;

Rule 5: The host maintains a copy of all TNP datagrams 202 transmitted until they are acknowledged;

Rule 6: If the host receives a TNP datagram 202 with the Ack bit set, then all previously transmitted packets with a sequence number (SeqNo) less then or equal to the AckSeqNo field of the received TNP datagram 202 are considered to be acknowledged;

Rule 7: If the host does not receive an acknowledgement for a previously transmitted TNP datagram 202 within a reasonable amount of time (PACKET_TIMEOUT), it retransmits that TNP datagram 202 and all subsequent TNP datagrams 202 with their respective sequence numbers. When re-transmitting a TNP datagram 202, the Ack, Nack, and AckSeqNo fields are updated to reflect the current state;

Rule 8: The host maintains an RXSEQNO sequence number to keep track of the sequence number of received TNP packets;

Rule 9: The RXSEQNO is initialized to the value of the SeqNo field+1 in the SYN-ACK TNP datagram 202 that pushed the host into the ACK state;

Rule 10: If a TNP datagram 202 with a payload is received with SeqNo equal to RXSEQNO, then the payload may be accepted and RXSEQNO incremented. If the host does not have enough buffering to accept the payload, it may discard the payload but still processes the other fields in the header. The host should transmit a TNP datagram 202 to the client with the Ack bit set and AckSeqNo set to the SeqNo of the received packet. The host may choose to delay transmission of the Ack until payload is available to be sent with it, or until multiple Acks can be combined together. However, the host should not delay transmission of the Ack so long that the client retransmits the original packet. If the payload of the datagram was discarded, then RXSEQNO should not be incremented, and a TNP datagram 202 containing an Ack should not be sent. The client may optionally transmit a TNP datagram 202 containing a Nack to the host indicating that the payload was lost and it needs to be retransmitted;

Rule 11: If a TNP datagram 202 with or without a payload is received with SeqNo greater than RXSEQNO, then the host transmits a TNP datagram 202 to the host with the Nack bit set and AckSeqNo set to RXSEQNO. The payload of any such packet is discarded; and Rule 12: The host should retransmit the most recently transmitted Ack with each TNP payload packet transmitted.

Once in the CONNECTED state, the client abides by the following rules:

Rule 1: The client maintains a TXSEQNO sequence number to keep track the sequence number of transmitted TNP datagrams 202;

Rule 2: The TXSEQNO may be initialized to any value. The initial value is transmitted in the SYN-ACK TNP datagram 202 initiating the connection. The TXSEQNO is incremented when the client receives the ACK TNP datagram 202 that pushes it into the CONNECTED state;

Rule 3: Each TNP datagram 202 transmitted by the client contains the value of TXSEQNO in the SeqNo field;

Rule 4: If a TNP datagram 202 is transmitted with a payload, then TXSEQNO is incremented after the packet is transmitted;

Rule 6: The client maintains a copy of all TNP datagrams 202 transmitted until they are acknowledged;

Rule 7: If the client receives a TNP datagram 202 with the Ack bit set, then all previously transmitted TNP datagrams 202 with a sequence number (SeqNo) less then or equal to the AckSeqNo field of the received packet are considered to be acknowledged;

Rule 8: If the client does not receive an acknowledgement for a previously transmitted TNP datagram 202 within a reasonable amount of time (PACKET_TIMEOUT), it retransmits that TNP datagram 202 and all subsequent packets with their respective sequence numbers. When retransmitting TNP datagrams 202, the Ack, Nack, and AckSeqNo fields are updated to reflect the current state;

Rule 9: The client maintains an RXSEQNO sequence number to keep track of the sequence number of received TNP packets;

Rule 10: The RXSEQNO is initialized to the value of the SeqNo field+1 in the SYN packet that pushed the client into the SYNACK state;

Rule 11: If a packet with a payload is received with SeqNo equal to RXSEQNO, then the payload may be accepted and RXSEQNO incremented. If the client does not have enough buffering to accept the payload, it may discard the payload but still processes the other fields in the header. The client should transmit a TNP packet to the host with the Ack bit set and AckSeqNo set to the SeqNo of the received packet. The client may choose to delay transmission of the Ack until payload is available to be sent with it, or until multiple Acks can be combined together. However, the client should not delay transmission of the Ack so long that the host retransmits the original packet;

Rule 12: If a packet with or without a payload is received with SeqNo greater than RXSEQNO, then the client transmits a packet with the Nack bit set and AckSeqNo set to RXSEQNO. The payload of any such packet is discarded; and Rule 13: The client should retransmit the most recently transmitted Ack with each TNP datagram 202 transmitted containing a payload.

Both the host and client each maintain a PACKET_TIMEOUT timer that determines how long the host or client should wait before assuming that a TNP datagram 202 was lost and retransmitting it. For example, if the PACKET_TIMEOUT timer is set to 5 ms on the client, then the client would wait for 5 ms after transmitting a TNP datagram 202 to the host, and if at that time the TNP datagram 202 has not been acknowledged, then it would retransmit the TNP datagram 202.

The host and client may use different values for the PACKET_TIMEOUT. The value of the PACKET_TIMEOUT timer is determined based on the round trip TNP datagram 202 to acknowledgement delay. It is up to the host or client to measure this round-trip delay and determine the appropriate value of PACKET_TIMEOUT. The client may optionally not implement the functionality to measure round-trip delay and program PACKET_TIMEOUT appropriately. In such a case, the host would be responsible for measuring round trip delay and instructing the client as to the appropriate value to be used for PACKET_TIMEOUT.

An existing connection can be disconnected by sending a TNP datagram 202 with the Rst bit set. A host wishing to teardown a connection should use the following procedure:

Step 1. Wait until all out-standing TNP datagrams 202 have been acknowledged, including retransmitting TNP datagrams 202 as necessary. If this does not occur within a reasonable amount of time, proceed to step 2;

Step 2. RST: Send the client a TNP datagram 202 with the Rst bit set; and

Step 3. RSTACK: Wait until the client responds with a TNP datagram 202 with the Rst and Ack bits. If this TNP datagram 202 is not received within a reasonable amount of time, return to step 2. If this procedure is repeated a reasonable number of times without success, the host may consider the connection tear-down complete.

Likewise, a client wishing to teardown a connection should use the following procedure:

Step 1. Wait until all out-standing TNP datagrams 202 have been acknowledged, including retransmitting TNP datagrams 202 as necessary. If this does not occur within a reasonable amount of time, proceed to step 2;

Step 2. RST: Send the host a TNP datagram 202 with the Rst bit set; and

Step 3. RSTACK: Wait until the host responds with a TNP datagram 202 with the Rst and Ack bits. If this TNP datagram 202 is not received within a reasonable amount of time, return to step 2. If this procedure is repeated a reasonable number of times without success, the client may consider the connection tear-down complete.

The host abides by the following rules:

Rule 1: If the host receives an RST TNP datagram 202, it ceases transmission of packets to the client;

Rule 2: If after sending a RST TNP datagram 202 the host does not receive a response containing an RSTACK within a reasonable amount of time (PACKET_TIMEOUT), it retransmits the RST. This may be repeated a reasonable number of times (RST_MAX_RETRY);

Rule 3: If the host receives an RST TNP datagram 202 from its peer while in the CONNECTED state, it responds with an RSTACK; and Rule 4: If the host receives any TNP datagram 202 from a non-peer, it responds with an RST.

The client abides by the following rules:

Rule 1: If the client receives an RST TNP datagram 202, it ceases transmission of packets to the client;

Rule 2: If the client receives an RST TNP datagram 202 from its peer while in the CONNECTED state, it responds with an RSTACK;

Rule 3: If the client receives any TNP datagram 202 from a non-peer, it responds with an RST;

Rule 4: If after sending a RST TNP datagram 202 the client does not receive a response containing an RSTACK within a reasonable amount of time (PACKET_TIMEOUT), it retransmits the RST. This may be repeated a reasonable number of times (RST_MAX_RETRY); and Rule 5: If the client receives an RSTACK TNP datagram 202, it is ignored.

The client may optionally implement a timeout, known as a activity timeout, that results in the connection being torn down if no TNP datagrams 202 are received for a reasonable amount of time. In such a case, the host may implement a keep-alive mechanism that periodically ensures that a TNP datagram 202 is transmitted to the client to keep the connection established and prevent the client for initiating a connection tear down. This keep alive packet need not contain anything other than the required fields, but may optionally contain an Ack.

If an atypically high rate of TNP datagrams 202 loss is experienced, it may be an indication of congestion on the network. The host and/or client may implement mechanisms to detect TNP datagram 202 loss and respond by reducing the amount of data being sent onto the network.

To reduce complexity on the client, the client may optionally not implement its own congestion control mechanisms. Instead, the host can detect when TNP datagrams 202 transmitted from the client to the host are being lost and respond by sending a command to the client instructing it to reduce its bandwidth utilization.

For connection oriented transport, a copy of each TNP datagram 202 sent is stored in a buffer until it is acknowledged. This buffer is referred to as the replay buffer. If the size of the replay buffer is smaller than the round-trip TNP datagram 202 to acknowledgement delay, then transfer rate may be limited. In general, the maximum data rate of a connection can be characterized by the following equation, $$MaxRate = ReplayBufferSize/RoundTripDelay$$

For example, a replay buffer of 15 KB with a round-trip delay of 20 ms would limit the data rate to 6.1 Mbps. The replay buffer should be sized by the client and host keeping in mind typical data rates and round trip delays.

$$ReplayBufferSize > MaxRate \times RoundTripDelay$$

Hence, if 10 Mbps of bandwidth is required on a network with a 50 ms round-trip delay, the minimum recommended replay buffer size is 64 KB.

The client or host may optionally choose to use a smaller replay buffer to save on resources, with the understanding that the maximum transfer rate will be limited. This may be acceptable for certain applications.

There is no need for the replay buffer sizes in the client and host to be matched. In a scenario where high data rates and required in one direction and not the other, it may make sense to size the buffers such that one is large and the other is small.

Because TNP datagrams 202 are buffered before they are transmitted, resources may be saved by reducing the maximum allowable size of a TNP datagram 202 that the client or host will transmit. There is no need for the maximum allowable size of be the same on the client and host. One may choose to transmit large packets, while the other chooses to transmit only small packets.

Depending on the particular embodiment, complexity and/or resource requirements may be shifted from the client to the host using one or more of the following methods:

Method 1: Congestion control mechanisms may be implemented only on the host side. The host would detect TNP datagram 202 loss and instruct the client as to its maximum bandwidth utilization;

Method 2: The SYNACK_TIMEOUT and SYNACK_MAX_RETRY timers may be removed from the client side. The host would implement additional recover mechanisms to detect these error conditions. The three-way handshake would be replaced with a four-way handshake as described above;

Method 3: The client may limit the number of connections it is capable of simultaneously accepting to a small number, such as one;

Method 4: The client may limit the size of the retry buffer to reduce the amount of required resources;

Method 5: The client may limit the maximum size of a TNP datagram 202 that it will transmit to reduce required resources;

Method 6: The client may choose to not implement the activity timeout;

Method 7: The client may choose to not support connection-oriented transport, and to only support connection-less transport;

Method 8: The client may choose not to initiate connection tear-down; and

Method 9: Many of the timeouts and retry counters described above are programmable in value. The client may choose to allow the host to control these values instead of trying to control them itself. For example, the PACKET_TIMEOUT timer that determines the amount of time before the client will retransmit a TNP datagram 202 may be programmable by the host. The host will program the client with the appropriate PACKET_TIMEOUT value based on the round-trip delay as measured by the host.

Further methods may exist to shift complexity from the client to the host. There are additional mechanisms that reduce the required complexity and/or resources on the client. For example, the client does not need to implement the mechanisms necessary to initiate a new connection because connections are always initiated by the host. Furthermore, the client need not implement a keep-alive mechanism as this is the responsibility of the host.

A connection-less transport interaction may consist of one, two, or three stages depending on the requirements of the interaction. These three stages are:

Stage 1. A TNP datagram 202 consisting one or more messages is sent from the host to the client;

Stage 2. Optionally, the client may respond with a TNP datagram 202 containing no messages and an acknowledgement of the reception of the TNP datagram 202 received in stage 1; and Stage 3. Optionally, the client may respond with one or more datagrams containing one or more messages in response to the message(s) received in stage 1.

Legal interactions include stage 1 only, stages 1 and 2 only, stages 1 and 3 only, all three stages, or stage 1 with stages 2 and 3 being combined into the same TNP datagram or datagrams 202.

During this interaction, it is possible that one or more TNP datagrams 202 will be lost. In such a case, recovery mechanisms may be used to retransmit the lost messages.

Message transfer between the host and client is asymmetric in that a heavier burden is placed on the host to correct for TNP datagram 202 loss if desired. TNP datagrams 202 transmitted from the host to the client are acknowledged. If after transmitting a TNP datagram 202, the host does not receive an acknowledgement, then either the original TNP datagram 202 was lost, or its acknowledgement was lost. Because it is not possible to determine which of the two was lost, recovery is left to higher levels in the network stack. The TNP host will notify higher levels which packets were acknowledged, and which were not.

In a connection-less transport interaction, the host and client should abide by the following rules:

Rule 1: If the host or client receives a TNP datagram 202 with the Oob bit set and no payload, it is discarded;

Rule 2: If the client receives a TNP datagram 202 with the Oob bit set, the NoAck bit cleared, and a payload, it responds with an Acknowledgement TNP datagram 202. The acknowledgement TNP datagram 202 has the Oob and Ack bits sets, SeqNo is undefined, AckSeqNo set to the value of the SeqNo of the TNP datagram 202 being acknowledged, and no payload. Exactly one Acknowledgement TNP datagram 202 is sent for each packet received;

Rule 3: The value of the SeqNo field of all Oob packets transmitted from the client is always undefined;

Rule 4: After processing the messages, the client may choose to send TNP datagrams 202 including response messages to the host; and Rule 5: In order to distinguish acknowledgements from one another, the host should not recycle sequence numbers until all numbers in the sequence number space have been exhausted.

TNP datagrams 202 sent from the client to the host are not acknowledged. The client has no way of knowing if a transmitted TNP datagram 202 was lost. If the host was expecting a TNP datagram 202 that was not received, recovery may be attempted by higher levels in the network stack.

It is possible for the host to have several host-client interactions as described above in flight simultaneously. In other words, the host does not need to wait until a TNP datagram 202 has been acknowledged before sending additional TNP datagrams 202 associated with subsequent interactions.

Because TNP datagrams 202 my be delivered out of order, it is useful to provide a mechanism such that the client can distinguish when TNP datagrams 202 from the host have been received out of order in the case of multiple outstanding host-client interactions.

For any series of interaction between a host and client, the client should maintain an ORDERID state variable. If a TNP datagram 202 arrives with both the Ordered and Syn bits set, the ORDERID state variable should be set to value of the OrderId field in the TNP datagram 202. If a TNP datagram 202 arrives with Ordered bit set, the Syn bit cleared, and the OrderId field in the TNP datagram 202 less than the ORDERID state variable, then the TNP datagram 202 should be discarded, and a NACK TNP datagram 202 sent to the host with the AckSeqNo field set to the SeqNo of the TNP datagram 202 being discarded. Otherwise, if a TNP datagram 202 arrives with the Ordered bit set, then the ORDERID state variable should be set to the value of OrderId in the TNP datagram 202. TNP datagrams 202 with the Ordered bit cleared should be treated normally according to the rules described above.

A host communicating with a client through a series of interactions should increment the OrderId field in the TNP datagram 202 only when order is important. It may be possible that several TNP datagrams 202 sent in sequence are not sequence dependent. In such a case, they may be sent all with the same OrderId.

The first time a host sends a TNP datagram 202 to a client with the Ordered bit set, it should also set the Syn bit to indicate to the client that it should initialize its ORDERID state variable. The host should continue to set the Syn bit until a TNP datagram 202 with the Syn bit is acknowledged.

A host that wishes to maintain order for TNP datagrams 202 need not set the Ordered bit for all TNP datagrams 202. The host may choose to set the bit only for TNP datagrams 202 for which sequence is important.

To reduce implementation complexity or required resources, the client may choose to not support ORDERID. In such a case, the Ordered bit in the TNP datagram 202 should be ignored.

To reduce implementation complexity or required resources, the client may choose to limit the number of hosts for which it maintains an ORDERID state variable. Furthermore, this may be limited only to hosts for which a connection-oriented transport connection has been established.

Figure 3A:
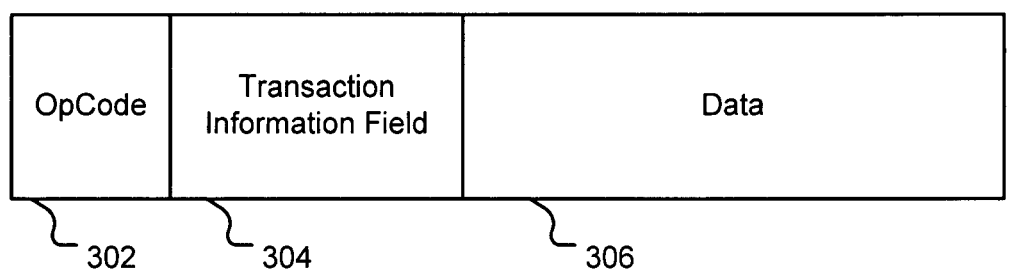
FIG. 3A is a diagram illustrating a general driver level message.

FIG. 3A is a diagram illustrating a general driver level message. This message includes an operation code ("OpCode") 302, of a driver level operation including control and status register ("CSR") reads, CSR writes, block data transfers, and interrupts. The message also includes a transaction information field 304 which contains metadata about the message, for example length. The data, if any, is stored in field 306. In some embodiments, to reduce latency, an interrupt OpCode 302 will combine interrupt data in data 310 with the interrupt message.

TNP 144 allows messages to be transferred in either direction between the host and client. Because there may be one or more producers or consumers of messages, it may be useful to allow each message to be associated with a particular producer or consumer. In some embodiments, a field in each message is included called EndPoint. The EndPoint field indicates which message consumer the message is destined to. Each message consumer is referred to as an end point.

A network may have many hosts and clients on it, and further there may be one or more types of hosts or clients on the network. For example, a network may simultaneously have a terminal server and a voice over internet protocol gateway each acting as hosts, and a thin client and voice over internet protocol handset each acting as a client. Hence, it is useful to provide standard mechanisms that clients may implement to aid with detection of a client, determination of the type of client, and configuration of the client.

In some embodiments, an End Point with ID 0 is implemented that is common across all types of devices. Any message received in a TNP datagram 202 with an EndPoint field of 0 is processed by End Point Zero.

Messages sent to End Point Zero of a client contain commands, also referred to as operations. The client may respond to a command by sending a message to End Point Zero of the host that the command arrived from. When End Point Zero of a client processes a message it stores the source of the TNP datagram that the message arrived in so that it can send a response back to the same host if necessary.

Furthermore, a client may choose to send messages to End Point Zero of a host to notify the host of certain events, such as interrupts or error conditions. These messages are initiated by the client and are not necessarily in response to a command sent by the host.

FIG. 3B is a diagram illustrating an example End Point Zero message. In some embodiments, messages sent to End Point Zero of a host or client contain the following fields:

OpCode: This field indicates the type of operation carried by the message. Valid OpCodes include No Operation, Configuration Read, Configuration Read Return, Configuration Write, CSR Write, CSR Read, CSR Read Return, Interrupt, and Error;

Len: Indicates the length of the operation in 32-bit words;

Addr: Indicates the starting word address of the operation; and

Data: The data associated with the operation if any.

End Point Zero on the client allows the host to detect and configure clients on the network. Access to the client is performed through Read and Write operations to resources on the client. The host indicates which resource is being operated on through an address field, which is used to address the resources. End Point Zero has two address spaces, referred to as Configuration address space, and CSR address space.

In some embodiments, End Point Zero on the client abides by the following rules:

Rule 1: Messages destined to End Point Zero on the host or client would have the format shown in FIG. 3B;

Rule 2: Whenever End Point Zero on the client receives a message requesting that an operation be performed and the operation requires that a response be sent back to the host, then the response message is sent to End Point Zero of the peer that the operation request arrived from using the same type of transport (connection-less or connection-oriented) that the request arrived on;

Rule 3: If the operation is a Configuration Read Request, then the resources located at the address in the Address field of the request through address (Address+Length−1) inclusive of the configuration address space should be read, and the data returned in an End Point Zero Message with OpCode Configuration Read Return, the read data in the Data field, and all other field being preserved from the original request;

Rule 4: If the operation is a CSR Read Request, then the resources located at the address in the Address field of the request through address (Address+Length−1) inclusive of the CSR address space should be read, and the data returned in an End Point Zero Message with OpCode CSR Read Return, the read data in the Data field, and all other field being preserved from the original request;

Rule 5: If the operation is a Configuration Write Request, then the resources located at the address in the Address field of the request through address (Address+Length−1) inclusive of the configuration address space should be written with the data in the Data field of the request;

Rule 6: If the operation is a CSR Write Request, then the resources located at the address in the Address field of the request through address (Address+Length−1) inclusive of the CSR address space should be written with the data in the Data field of the request;

Rule 7: An interrupt controller connected to End Point Zero may request that an interrupt be sent to the host. In such a case, a End Point Zero Message with OpCode Interrupt should be sent to the host. The Address, Data, and Transaction ID fields can be used to carry further information identifying the source, type, and characteristics of the interrupt. The interrupt controller would have to inform End Point Zero of which hosts to transmit an interrupt to, although by default the interrupt would be sent to all hosts with an established connection to the client; and Rule 8: If an error occurs while completing a read or write request, either because of an invalid address, a timeout, or some other error condition, the client may wish to send an error response to the host. In such a case, an End Point Zero Message with OpCode Error and all other fields being preserved should be sent back in place of the response.

In some embodiments, the resources in configuration address space are intended to be the same across all types of devices. These resources are used to determine the type of device, and to configure common aspects of these devices. Those resources unique to a device are intended to be in the CSR address space. Likewise, the properties of End Point Zero are intended to be common across all devices, and all other end points are intended to be used for purposes unique to each type of device.

FIG. 3C is a table illustrating an example configuration address space and its resources. The contents and capabilities of the configuration address space may be extended by the use of capability structures. A capability structure is contiguous block of addresses in configuration address space, with the first few addresses containing a standard set of resources describing the capability structure, and the remainder of the address block containing resources specific to that type of capability structure. The purpose of capability structures is to define resources found in configuration address space that have a common structure, but may be implemented optionally be devices.

FIG. 3D is a table illustrating an example capability structure format. Capability structures are arranged as a linked list in configuration address space. The first one in the chain is pointed to by the pointer at address 0x0004. Each capability structure will in turn point to the next one in the list. The last capability structure in the list will have a pointer with value 0x0. Capability structures are addressed with an offset relative to the address pointed to by the pointer.

A capability structure called the TNP Capability Structure is:

| Offset (Hex) | Description |
|---|---|
| 0x0000 | Capability Structure ID (0x001). Read Only. |
| 0x0001 | Next Capability Structure Pointer. Read Only. |
| 0x0002 | PACKET_TIMEOUT: Amount of time to wait before retransmitting a TNP datagram, as defined above. Read-Write. |
| 0x0003 | Maximum Transmit Rate: The maximum rate at which data may be transmitted onto the network. Read-Write. |
| 0x0004 | Maximum Transmit Unit: The maximum size of a datagram that may be transmitted onto the network. Read-Write. |
| 0x0005 | Maximum Receive Unit: The maximum size of a datagram that may arrive from the network. Read-Only. |
| 0x0006 | Maximum Connections: The maximum number of established connection supported by the device. Read-Only. |
| 0x0007 | Feature Vector: Vector of read-only bits, where each bit indicates if a particular feature is supported. Bit 0 indicates if SYNACK_TIMEOUT is supported. Read Only. |
| 0x0008 | DHCP Enable: Indicates Dynamic Host Configuration Protocol ("DHCP") should be used to obtain an IP address. Read-Write. |
| 0x0009 | Ethernet Address (High): Upper 16-bits of the devices' Ethernet address. Read-Only. |
| 0x000a | Ethernet Address (Low): Lower 16-bits of the devices' Ethernet address. Read-Only. |
| 0x000b | IP Address: IP address assigned to the device. Read-Only if DHCP is enabled, Read-Write if DHCP is disabled. |
| 0x000c | IP Mask: IP netmask assigned to the device. Read-Only if DHCP is enabled, Read-Write if DHCP is disabled. |
| 0x000d | UDP Port: UDP port assigned to the device. Read-Write. |
| 0x000e | Default Gateway: Default gateway assigned to the device. Read-Only if DHCP is enabled, Read-Write is DHCP is disabled. |
| 0x000f | SYNACK_TIMEOUT: Amount of time to wait before retransmitting a SYNACK. Read-Write. |
| 0x0010 | Broadcast Enable: Indicates if broadcast TNP datagrams should be processed or discarded. Read-Write. This bit is initially 1, meaning that broadcasts are enabled. If a 0 is written to this bit, a timer BCASTEN_TIMEOUT will automatically be started. When this timer expires, this bit will automatically be set to 1 again. |
| 0x0011 | BCASTEN_TIMEOUT: Specifies the amount of time until the broadcast enable bit is re-enabled after is has been disabled. Read-Write. |
| 0x0012 | Announce Enable: Indicates if a broadcast TNP datagram should be periodically sent out announcing the presence of the client on the network. Like Broadcast Enable, this bit will automatically be re-enabled by the ANNOUNCE_REENABLE_TIMER. ANNOUNCE_PERIOD: Indicates the period at which announcement should be sent out onto the network. A value of zero indicates that announcements should never be sent. Read-Write. Announce UDP Port: The destination UDP port number to be used for announcement datagrams. Read-Write.c ANNOUNCE_REENABLE_TIMER: The amount of time before Announce Enable should be re-enabled. Read-Write. |

FIG. 3E is a table illustrating an example TNP Peer Capability Structure. Multiple instances of the TNP Peer Capability Structure may exist if the devices supports more than one simultaneously connected peer.

When a client is initially powered on or attached to a network, it may wish to establish a connection with a host. Because a host initiates a connection requests, there are three mechanisms in place to help a client to be found and connected to by a host.

The first method involves a host periodically sending out a broadcast onto the network searching for clients. A TNP datagram 202 broadcast onto the network will contain a message to End Point Zero containing a Configuration Read Request operation to address 0x0000. Each client on the network that receives this request will send a Configuration Read Return message back to the host. Hence, by periodically repeating this process, the host will eventually collect a list of all clients on the network.

When processing broadcast requests, clients may choose to wait a random amount of time before transmitting the response. This will ensure that a response storm does not hit the network at once from a large number of clients.

Once a client has been discovered by a host, the Broadcast Enable bit in the TNP Capability Structure should be disabled to prevent it from responding to future broadcasts. This bit is periodically re-disabled to prevent it from being re-enabled by the BCASTEN_TIMEOUT timer. The purpose of the timer is to allow the device to be rediscovered if the host that disabled the Broadcast Enable bit disappears from the network unexpectedly.

The second method involves the client periodically sending out a broadcast onto the network to announce its presence. The broadcast is a TNP datagram 202 with a message to End Point Zero with an OpCode of Announce, and the remainder of the message being identical to a Configuration Read Return to address 0x0000 and a length of 4 words.

The final method involves the client periodically sending an announcement message to a particular host. The identity of the host already is known to the client through some other means such as a smart card, or other form of non-volatile storage.

Some network devices are required to implement the Address Resolution Protocol ("ARP") to translate IP addresses to Ethernet (or other L2) addresses. A typical ARP implementation has two components: Response and Request. The response component will listen to the network for ARP requests and send a response back. The request component will send requests onto the network and listen on the network for a response.

The client may be simplified by only implementing the response component of ARP, and not the request component. In such a case, the client will be limited in that it will not be able to send packets to IP addresses from which a packet was net recently received. Because the host will normally initiate a connection to the client, the client will know the Ethernet address of the host before sending it a response.

Figure 4:
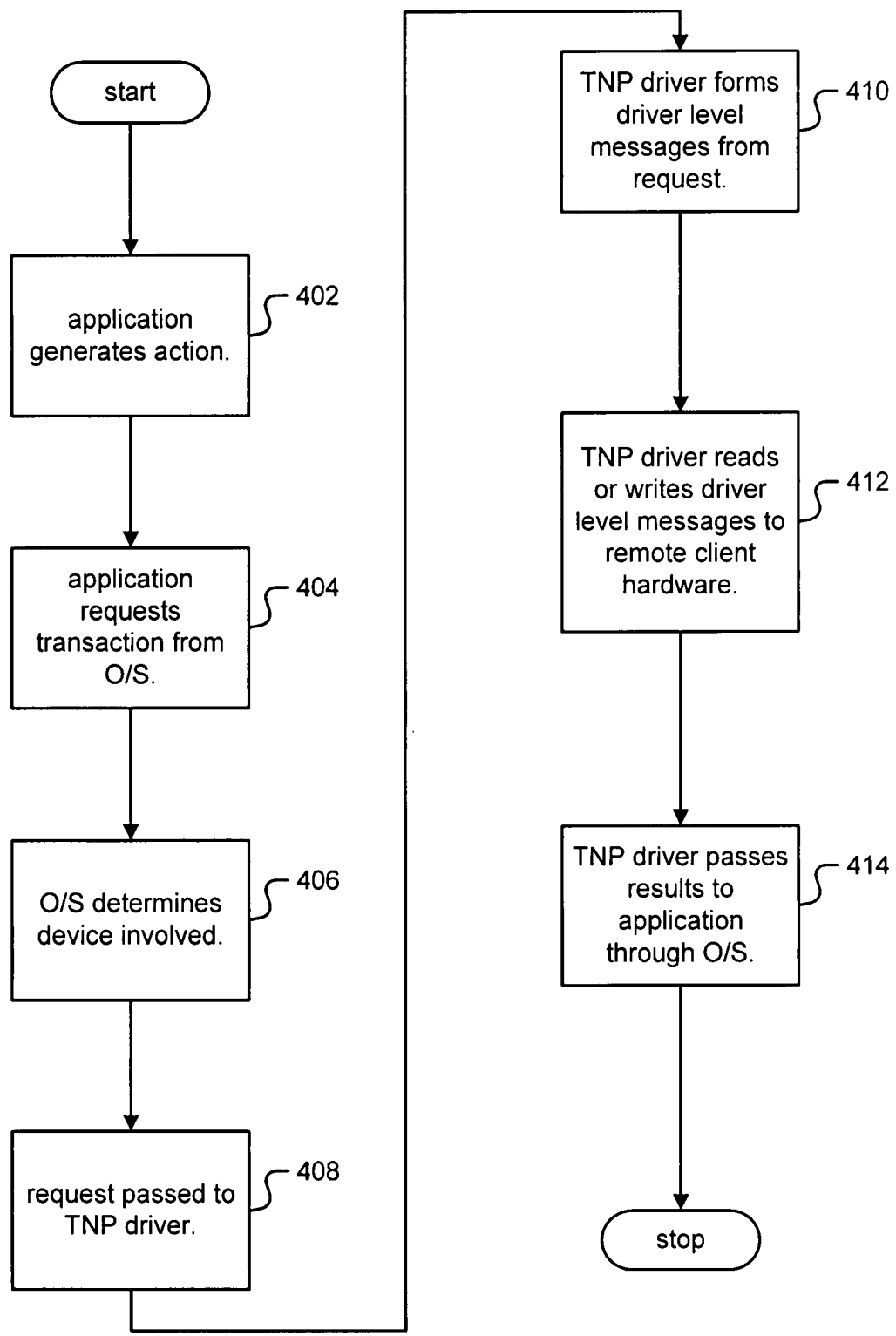
FIG. 4 is a flowchart illustrating an embodiment of a process for an application to process a transaction on remote client hardware without emulating a remote protocol.

FIG. 4 is a flowchart illustrating an embodiment of a process for an application to process a transaction on remote client hardware without emulating a remote protocol. The process may be implemented in server 152.

In a step 402, an application in server 152 generates an action that may require interaction with thin client 146. In a step 404, the application's action requests a transaction from the operating system in server 152. In a step 406, the operating system determines the device or devices involved in the transaction. In this example, the device includes thin client 146. In a step 408, the operating system therefore passes a request to the TNP driver in server 152.

In a step 410, the TNP driver in the server and client driver layer of server 152 forms driver level messages from the request. In some embodiments, this step formulates the TNP datagram 202. In a step 412, the TNP driver reads or writes driver level messages to the thin client 146, and in a step 414, the TNP driver passes the results to the application via the operating system.

Figure 5:
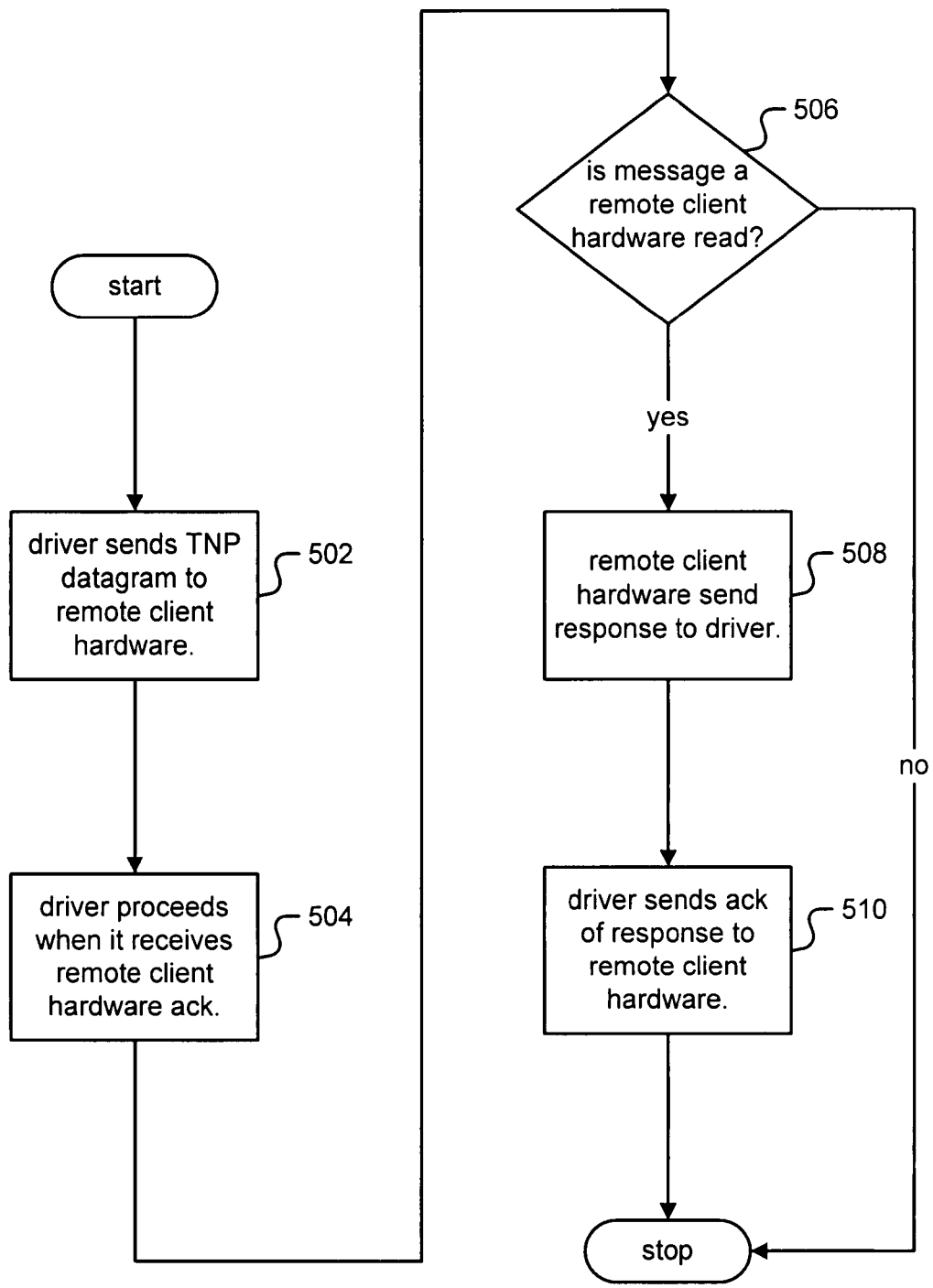
FIG. 5 is a flowchart illustrating an embodiment of a process for a driver to read or write driver level messages to a remote hardware client.

FIG. 5 is a flowchart illustrating an embodiment of a process for a driver to read or write driver level messages to a remote hardware client. In some embodiments, the process of FIG. 5 is included in 412 of FIG. 4. The process may be implemented in server 152.

In a step 502, the driver sends the TNP datagram 202 formed in 410 to the thin client 146 over network protocol 144. In a step 504, the driver proceeds after it receives a hardware acknowledge, or ack from the remote client using the appropriate connection field 204 of the TNP datagram 202 from thin client 146. If it is determined at step 506 that the original driver level message was a remote client hardware read, for example a device configuration read or CSR read, then control is transferred to step 508. If it is determined at step 506 that the original driver level message was not a remote client hardware read, for example a device configuration write or CSR write, then the remote client hardware ack at step 504 signifies the device configuration write or CSR write was successful.

In a step 508, the thin client 146 sends a remote client hardware read return back to the driver, for example a device configuration read return or CSR read return. In a step 510, the driver signifies a successful remote client hardware read by sending an ack of the read return to the thin client 146.

Figure 6:
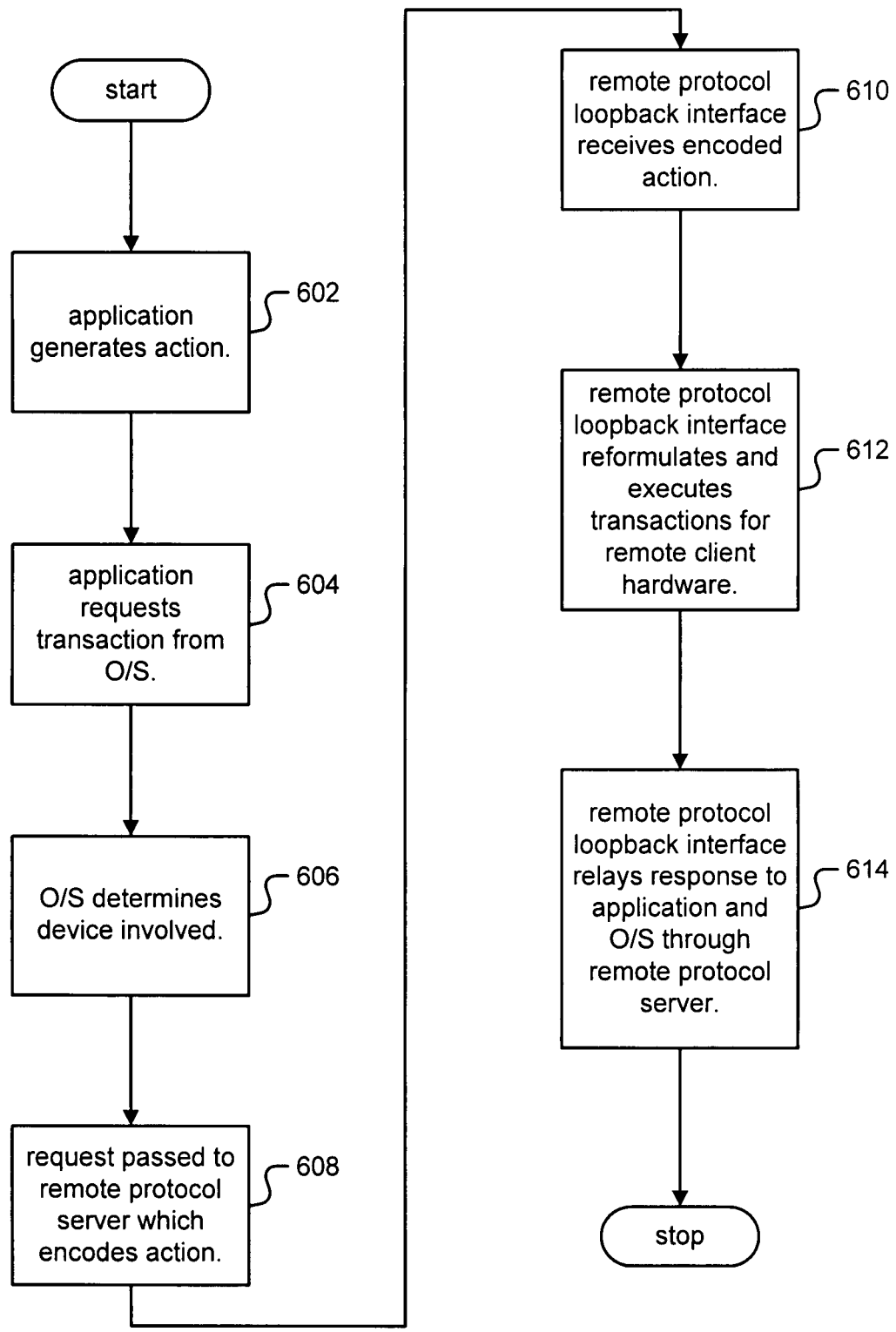
FIG. 6 is a flowchart illustrating an embodiment of a process for an application to process a transaction on remote client hardware by emulating a remote protocol.

FIG. 6 is a flowchart illustrating an embodiment of a process for an application to process a transaction on remote client hardware by emulating a remote protocol. The process may be implemented in server 142.

In a step 602, an application in server 142 generates an action that may require interaction with thin client 146. In a step 604, the application's action requests a transaction from the operating system in server 142. In a step 606, the operating system determines the device or devices involved in the transaction. In this example, the device includes thin client 146. In a step 608, the operating system therefore passes a request within the remote protocol server 124 which encodes the action in the remote protocol format.

In a step 610, the remote protocol loopback interface 148 receives the encoded action from step 608, which is interpreted and reformulated as a driver level message from the encoded action. In some embodiments, this step formulates the TNP datagram 202. In a step 612, the remote protocol loopback interface 148 reads or writes driver level messages to the thin client 146. In some embodiments, the process of FIG. 5 is included in step 612 using the internal remote protocol loopback interface 148 as a driver. In a step 614, the remote protocol loopback interface 148 reinterprets the results in the remote protocol format, to relay the reinterpreted response to remote protocol server 124. The remote protocol server 124 then passes the results to the application via the operating system.

Figure 7:
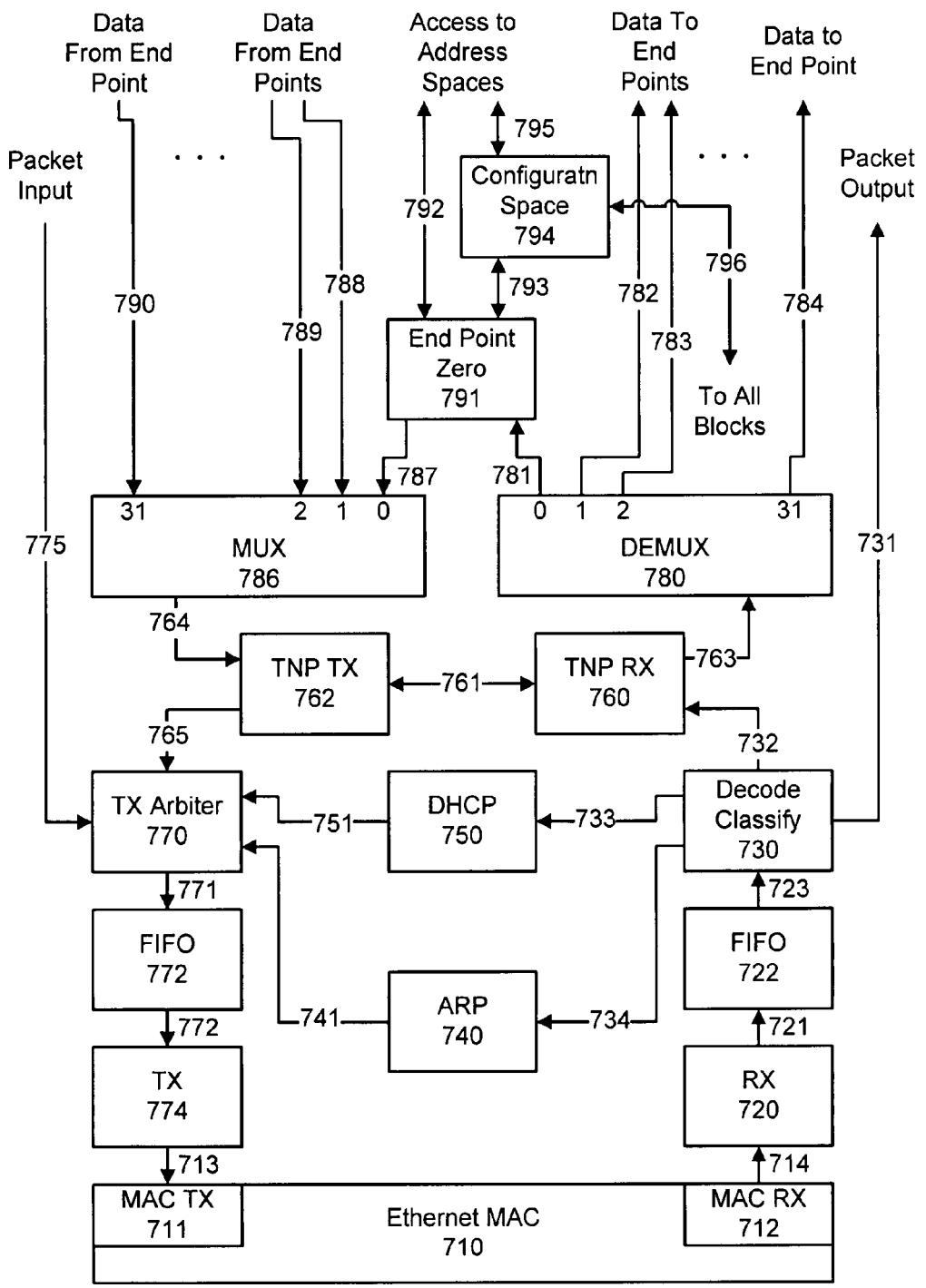
FIG. 7 is a diagram illustrating an embodiment of a thin client implemented in digital logic hardware.

FIG. 7 is a diagram illustrating an embodiment of a thin client implemented in digital logic hardware. The example may be implemented in thin client 146. The Ethernet MAC 710 module implements the logic necessary to operate on an Ethernet network. This includes the MAC RX 712 receive section, and the MAC TX 711 transmit section. Packets received on the network from MAC RX 712 are sent over a bus 714 to the RX controller 720. The link 714 is a unidirectional link with no flow control. The RX controller 720 writes packets into a receive FIFO 722. If the FIFO fills, the RX controller 720 will delete the packet from the FIFO and rewind the pointers. If MAC RX 712 informs the RX controller 720 at any time that a packet received is bad, it will be deleted from the FIFO 722 and the FIFO pointers rewinded.

Once a packet has been written to the FIFO 722 in its entirety, the decode classify controller 730 will read the packet out of the FIFO 722. The decode classify controller 730 will examine the contents of the packet and forward it to the appropriate controller: ARP 740 over link 734, DHCP 750 over link 733, TNP RX 760 over link 732, or packet output over link 730. Links 731, 732, 733, and 734 include backpressure to indicate when the target controllers can no longer accept data. When backpressure is indicated on these links, the decode classify controller may initiate backpressure on link 723 to the FIFO 722. The decode classify controller 730 will not propagate backpressure from its output links (131 through 734) until a packet is being forwarded to a link where backpressure is asserted. This is to prevent head of line blocking. For example, if ARP 740 is asserting backpressure, this should not prevent packets from being transmitted to TNP RX 760. The decode classify controller 730 will decode incoming packets and strip headers if necessary.

If the decode classify controller 730 determines that a packet's destination is ARP 740, it will remove the Ethernet header and send the Ethernet payload to the ARP 740 controller. The ARP 740 controller will decode the ARP packet. If the ARP packet is an ARP request, an ARP response will be sent over link 741 to the TX Arbiter 770. If the ARP packet is an ARP response, it will be decoded and the results of the ARP operation stored for future use. The ARP controller 740 will include buffering as necessary. If the TX arbiter 770 indicates backpressure over link 741, and the ARP controller 740 has no remaining buffer, backpressure will be asserted to the decode classify controller over link 734.

If the decode classify controller 730 determines that a packet's destination is DHCP 750, it will remove the Ethernet, IP, and UDP headers and send the UDP payload to the DHCP 750 controller. The DHCP 750 controller will decode the DHCP packet. The DHCP controller 750 will decode the received packet and act according to the rules of the DHCP standard. As necessary by the DHCP standard, the DHCP controller 750 will generate packets and transmit them over link 751 to the TX Arbiter 770. The DHCP controller 750 will include buffering as necessary. If the DHCP controller 770 does not have enough remaining buffer to accept further data, it will assert backpressure over link 733 to the decode classify controller 730. Likewise, if the TX Arbiter 770 can no longer accept data from the DHCP controller 750, it will assert backpressure on the link 751.

If the decode classify controller 730 determines that a packet's destination is TNP RX 760, it will remove the Ethernet, IP, and UDP headers and send the UDP payload to the TNP RX 760 controller. The TNP RX 760 controller will decode the packet according to the rules of the TNP protocol as described in this specification. If the packet contains messages, those messages will be forwarded to DEMUX 780 over link 763. DEMUX 780 may assert backpressure over link 763, causing backpressure to be pushed back over link 732 to the decode classify controller 730. The TNP RX controller 760 may notify TNP TX 762 over link 761 of requests to transmit packets onto the network, or state updates. This may include requests for ACK, NACK, SYNACK, RST, packets, and notifications of state changes such as the establishment or teardown of a connection. The TNP TX 762 may assert backpressure over link 761.

The TNP TX 762 processes requests from TNP RX 760 and transmits packets over link 765 to TX Arbiter 770. The TNP TX 762 also receives messages from MUX 786 and assembles them into packets and sent over link 765 to TX Arbiter 770. All processes performed by TNP TX 762 are done in accordance with the rules of the TNP protocol as described in this specification.

The TX Arbiter 770 receives packets from TNP TX 762, DHCP 760, or ARP 740, and adds the necessary Ethernet, IP, and/or UDP headers, and checksums. These packets are placed into a FIFO 772 using link 771. As the FIFO fills, backpressure is asserted over link 771, and is propagated to links 765, 751, and 741. The TNP TX 762 implements a minimal amount of buffering to receive packets from its inputs.

The TX controller 774 removed packets from the FIFO 772 and sends them to the MAC TX controller 711 to be transmitted onto the Ethernet wire. Upon request from the MAC TX 711 controller, the TX 774 will retransmit the most recent packet to handle the special case of packet collisions on the network.

The decode classify controller 730 and TX arbiter 770 implements receive and transmit links 731 and 775 to allow additional packet processing beyond the scope embodiment. If a packet is received by the decode classify controller 730, and it does not match the criteria necessary to forward it to TNP RX 760, DHCP 750, or ARP 740, it will be forwarded to link 731. Link 731 implements flow control analogous to that of links 732, 733, and 734. Likewise, packets may be injected into the Ethernet through link 775 to the TX Arbiter 770. Link 775 implements flow control analogous to that of links 741, 751, and 765.

The DEMUX 780 receives messages and forwards them to the appropriate end-point over links 781 through 784. Links 781 through 784 implement backpressure, which is propagated by DEMUX 780 to link 763.

The MUX 786 receives messages from the various end-points over links 787 through 790. These messages are forwarded to TNP TX 762 according to arbitration algorithms to ensure fair bandwidth sharing. If TNP TX 762 asserts backpressure over link 764, MUX 786 will stop forwarding messages. Each link 787 through 790 has a dedicated FIFO associated with it. As those FIFOs fill, backpressure will be asserted to the individual end-points.

End-Point Zero 791 operates according to the rules of End Point Zero described in this specification. Messages are received over link 781, and transmitted over link 787. Transactions are forwarded to the appropriate address spaces over links 793 or 792. Some configuration space is implemented by Configuration Space controller 794. Portions of configuration space not implemented by Configuration Space controller 794 are forwarded to links 795 or 796. Link 795 is used for those portions of configuration space implemented outside the scope of this embodiment. Link 796 is used to access those portions of configuration space implemented by the remaining blocks in the embodiment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A server to process a transaction on a remote client hardware, including:
   an interface;
   a processor; and
   a memory coupled with the processor, wherein the memory is configured to provide the processor with instructions which when executed cause the processor to:
   receive a local request for the transaction;
   determine the transaction involves a driver level read of the remote client hardware;
   generate a driver level message for the remote client hardware that includes an opcode for a register read request and a register address field;
   wherein the register read request comprises a Configuration Read Request and a CSR Read Request and the register address field comprises a Configuration address field and a CSR address field;
   send the driver level message for the register read request directly to a hardware register addressed by the register address field on the remote client hardware; and
   sending the driver level message directly refers to any sending of a driver level message such that the remote client hardware requires no processing of the driver level message by the remote client hardware.

2. A server as recited in claim 1, wherein the driver level message is a message that is practically implementable by hardware, without the need for an instruction based processing element.

3. A server as recited in claim 1, wherein the driver level message is a message that is practically implementable by hardware and is selected from a group consisting of CSR reads, CSR writes, block data transfers, and interrupts.

4. A server as recited in claim 1, wherein the driver level message is a message that is practically implementable by hardware and is selected from a group consisting of CSR reads, CSR writes, block data transfers, and interrupts, and the remote client hardware combines interrupt data with the interrupts.

5. A server as recited in claim 1, wherein the transaction occurs over a digitally switched network.

6. A server as recited in claim 1, wherein the transaction occurs over a digitally switched network on a packet-based protocol.

7. A server as recited in claim 1, wherein the transaction occurs over a digitally switched network on a packet-based protocol with unreliable service.

8. A server as recited in claim 1, wherein the transaction occurs over a digitally switched network on a packet-based protocol with unreliable service, UDP/IP.

9. A server as recited in claim 1, wherein the transaction occurs within connection-oriented transport.

10. A server as recited in claim 1, wherein the transaction occurs within connectionless transport.

11. A server as recited in claim 1, wherein remote client hardware include devices that generate a client-originated driver level message and send the client-originated driver level message directly to the server.

12. A server as recited in claim 1, wherein remote client hardware include devices restricted to a small number of connections, or one connection.

13. A server as recited in claim 1, wherein remote client hardware include devices using double buffering of a frame buffer.

14. A server as recited in claim 1, wherein remote client hardware include devices comprised of only hardware.

15. A server as recited in claim 1, wherein remote client hardware include stateless devices.

16. A server as recited in claim 1, wherein remote client hardware include stateless devices, without the need for an instruction based processing element.

17. A server as recited in claim 1, wherein remote client hardware include thin clients.

18. A server as recited in claim 1, wherein remote client hardware include network printers.

19. A server as recited in claim 1, wherein remote client hardware include VoIP phones.

20. A server as recited in claim 1, wherein remote client hardware include computer peripherals, where computer peripherals are selected from the group consisting of serial devices, parallel devices, USB devices, Firewire devices, keyboard devices, mouse devices, human input devices, video devices, audio devices, printers, scanners, and network adapters.

21. A server as recited in claim 1, wherein the server supports a loopback interface for compatibility with a remote protocol.

22. A server as recited in claim 1, wherein the server supports client USB termination on the server.

23. A server as recited in claim 1, wherein the remote client hardware includes thin clients.

24. A server as recited in claim 2, wherein the remote client hardware includes thin clients.

25. A server as recited in claim 3, wherein the remote client hardware includes thin clients.

26. A server as recited in claim 9, wherein the remote client hardware includes thin clients.

27. A server as recited in claim 1, wherein remote client hardware include computer peripherals, where computer peripherals are selected from the group consisting of serial devices, parallel devices, USB devices, Firewire devices, keyboard devices, mouse devices, human input devices, video devices, audio devices, printers, scanners, and network adapters.

28. A server as recited in claim 2, wherein remote client hardware include computer peripherals, where computer peripherals are selected from the group consisting of serial devices, parallel devices, USB devices, Firewire devices, keyboard devices, mouse devices, human input devices, video devices, audio devices, printers, scanners, and network adapters.

29. A server as recited in claim 3, wherein remote client hardware include computer peripherals, where computer peripherals are selected from the group consisting of serial devices, parallel devices, USB devices, Firewire devices, keyboard devices, mouse devices, human input devices, video devices, audio devices, printers, scanners, and network adapters.

30. A server as recited in claim 9, wherein remote client hardware include computer peripherals, where computer peripherals are selected from the group consisting of serial devices, parallel devices, USB devices, Firewire devices, keyboard devices, mouse devices, human input devices, video devices, audio devices, printers, scanners, and network adapters.

31. A server as recited in claim 16, wherein an instruction based processing element includes one of the following: a CPU, an MCU and a DSP.

32. A server as recited in claim 1, wherein the transaction occurs over a thin network protocol.

33. A server as recited in claim 32, wherein the thin network protocol is structured on top of UDP/IP.

34. A method for a server to process a transaction on a remote client hardware, including:
   receiving a local request for the transaction;
   determining the transaction involves a driver level read of the remote client hardware;
   generating a driver level message to the remote client hardware that includes an opcode for a register read request and a register address field;
   wherein the register read request comprises a Configuration Read Request and a CSR Read Request and the register address field comprises a Configuration address field and a CSR address field;
   sending the driver level message for the register read request directly to a hardware register addressed by the register address field on the remote client hardware; and
   sending the driver level message directly refers to any sending of a driver level message such that the remote client hardware requires no processing of the driver level message by the remote client hardware.

35. A method as recited in claim 34, wherein the transaction occurs over a digitally switched network.

36. A method as recited in claim 34, wherein remote client hardware include devices comprised of only hardware.

37. A method as recited in claim 34, wherein remote client hardware include stateless devices.

38. A method as recited in claim 34, wherein remote client hardware include thin clients.

39. A method as recited in claim 34, wherein remote client hardware include network printers.

40. A method as recited in claim 34, wherein remote client hardware include VoIP phones.

41. A method as recited in claim 34, wherein remote client hardware include computer peripherals, where computer peripherals are selected from the group consisting of serial devices, parallel devices, USB devices, Firewire devices, keyboard devices, mouse devices, human input devices, video devices, audio devices, printers, scanners, and network adapters.

42. A remote client hardware device for processing transactions generated by a server including:
   an interface configured to send a driver level message to a server;

a hardware component; and
an interrupt controller coupled with the hardware component and the interface, configured to:
   determine an interrupt for the hardware component should be sent to a server;
generate a driver level message for the server that includes an opcode for an Interrupt,
wherein the opcode for the Interrupt includes an opcode for a register read request and a register address field;
wherein the register read request comprises a Configuration Read Request and a CSR Read Request and the register address field comprises a Configuration address field and a CSR address field;
send the driver level message for the Interrupt directly to the server; and
the remote client hardware does not require processing of driver level messages.

43. A remote client hardware device as recited in claim 42, wherein the transaction occurs over a digitally switched network.

44. A remote client hardware device as recited in claim 42, wherein remote client hardware include devices comprised of only hardware.

45. A remote client hardware device as recited in claim 42, wherein remote client hardware include stateless devices.

46. A remote client hardware device as recited in claim 42, wherein remote client hardware include thin clients.

47. A remote client hardware device as recited in claim 42, wherein remote client hardware include network printers.

48. A remote client hardware device as recited in claim 42, wherein remote client hardware include VoIP phones.

* * * * *